(12) United States Patent  (10) Patent No.: US 7,504,986 B2
Brandt et al.  (45) Date of Patent: Mar. 17, 2009

(54) BLIND SPOT SENSOR SYSTEM

(75) Inventors: Martin Brandt, Wörth a.d. Donau (DE); Matthias Töns, Regensburg (DE)

(73) Assignee: Continental Automotive GmbH, Munich (DE)

( * ) Notice: Subject to any disclaimer, the term of this patent is extended or adjusted under 35 U.S.C. 154(b) by 164 days.

(21) Appl. No.: 11/587,200

(22) PCT Filed: Apr. 18, 2005

(86) PCT No.: PCT/EP2005/051699

§ 371 (c)(1), (2), (4) Date: Nov. 13, 2006

(87) PCT Pub. No.: WO2005/103757

PCT Pub. Date: Nov. 3, 2005

(65) Prior Publication Data

US 2007/0179712 A1  Aug. 2, 2007

(30) Foreign Application Priority Data

Apr. 22, 2004 (DE) .................. 10 2004 019 651

(51) Int. Cl.
 *G01S 13/93* (2006.01)
(52) U.S. Cl. ................... 342/70; 342/90; 342/130; 340/435; 340/436; 340/903
(58) Field of Classification Search .......... 342/70–72, 342/90, 128–135; 701/300, 301; 340/903, 340/435, 436
See application file for complete search history.

(56) References Cited

U.S. PATENT DOCUMENTS 6,121,916 A    9/2000  McDade
6,825,756 B2 * 11/2004  Bai et al. .................. 340/435

(Continued)

FOREIGN PATENT DOCUMENTS

DE    198 32 079 A1    1/2000

(Continued)

OTHER PUBLICATIONS

Author not named, "A Method to Improve the Performance of an Automotive Side Detection System", research disclosure XP-000726474, dated May 1997, p. 357.

*Primary Examiner*—John B Sotomayor
(74) *Attorney, Agent, or Firm*—Laurence A. Greenberg; Werner H. Stemer; Ralph E. Locher

(57) ABSTRACT

A blind spot sensor system detects and/or classifies objects in a defined monitoring region of a motor vehicle. The blind spot sensor system contains a first device for emitting a first radar beam, and a second device for emitting a second radar beam. The radial visual range of the first radar beam (beam I) inclines counter to a direction of travel of the motor vehicle and the radial visual range of the second radar beam (beam II) is oriented in an substantially vertical manner in relation to the direction of travel such that the visual range of the radar beams (I and II) at least partially overlap and cover, substantially, the monitoring region. At least the first radar beam (beam I) can be actuated in a CW modulation mode and in a FMCW modulation mode. The blind spot sensor is used in vehicles, for example for assisting in lane changing.

28 Claims, 18 Drawing Sheets

U.S. PATENT DOCUMENTS

| | | | |
|---|---|---|---|
| 6,844,843 B2 * | 1/2005 | Ishii et al. ............... | 342/91 |
| 6,873,250 B2 * | 3/2005 | Viana et al. ............. | 340/435 |
| 7,403,153 B2 * | 7/2008 | Kelly et al. .............. | 342/159 |
| 2002/0147534 A1 | 10/2002 | Delcheccolo et al. | |
| 2003/0001772 A1 | 1/2003 | Woodington et al. | |
| 2003/0004644 A1 * | 1/2003 | Farmer ..................... | 701/301 |
| 2003/0146826 A1 * | 8/2003 | Viana et al. ............. | 340/435 |
| 2004/0108952 A1 * | 6/2004 | Ishii et al. ............... | 342/174 |
| 2004/0145512 A1 * | 7/2004 | Takano et al. ........... | 342/70 |
| 2007/0179712 A1 * | 8/2007 | Brandt et al. ............ | 701/300 |
| 2007/0200747 A1 * | 8/2007 | Okai et al. ............... | 342/70 |
| 2008/0042895 A1 * | 2/2008 | Inaba ....................... | 342/112 |
| 2008/0100500 A1 * | 5/2008 | Kondoh .................... | 342/109 |

FOREIGN PATENT DOCUMENTS

| | | |
|---|---|---|
| EP | 0 740 166 A1 | 10/1996 |
| EP | 0899 583 A2 | 3/1999 |
| EP | 0 939 322 A2 | 9/1999 |
| EP | 0 974 851 A2 | 1/2000 |
| FR | 2 613 080 | 9/1988 |
| WO | WO 98/32029 | 7/1998 |
| WO | WO 02/14891 A2 | 2/2002 |
| WO | WO 2004/068164 A2 | 8/2004 |

* cited by examiner

FIG 1

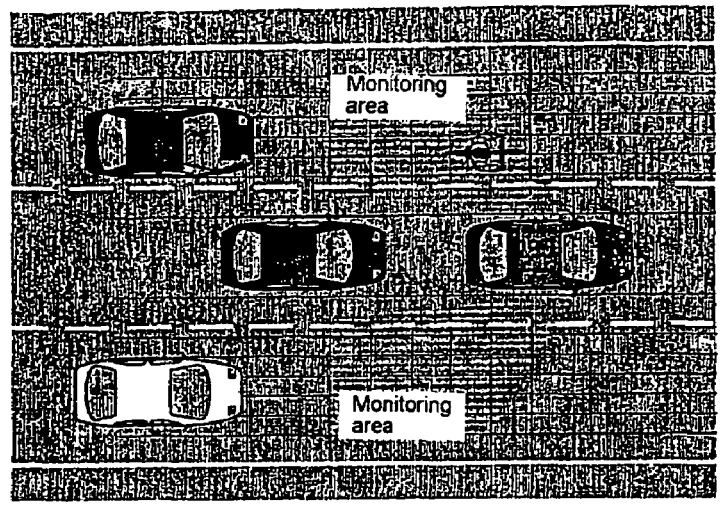

FIG 2

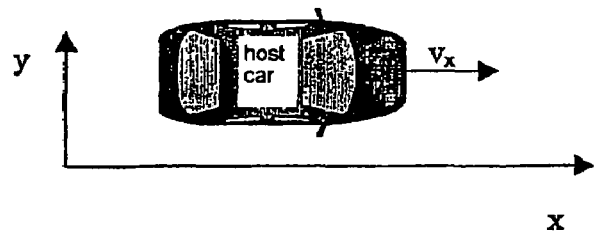

FIG 3

| relevant objects | | | non relevant objects | | |
|---|---|---|---|---|---|
| object in the monitoring region | $v_x$ | $v_y$ | object in the monitoring region | $v_x$ | $v_y$ |
| car | $v_0 > v_{x\,Obj} > v_x$ | all | car (oncoming traffic) | $v_{x\,Obj} < 0$ | all |
| lorry | $v_0 > v_{x\,Obj} > v_x$ | all | lorry (oncoming traffic) | $v_{x\,Obj} < 0$ | all |
| motorcycle | $v_0 > v_{x\,Obj} > v_x$ | all | motorcycle (oncoming traffic) | $v_{x\,Obj} < 0$ | all |
| car, lorry, motorcycle | $v_1 < v_{x\,Obj} < v_x$ | all | crash barrier | all | all |
| car, lorry, motorcycle | $v_{x\,Obj} = v_x$ | all | posts | all | all |
| | | | wall | all | all |
| | | | car, lorry (parked) | 0 | 0 |

FIG. 11
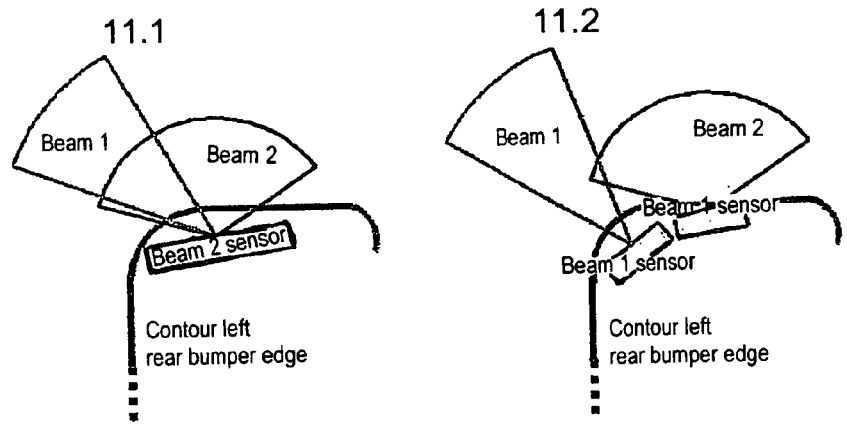
FIG. 12
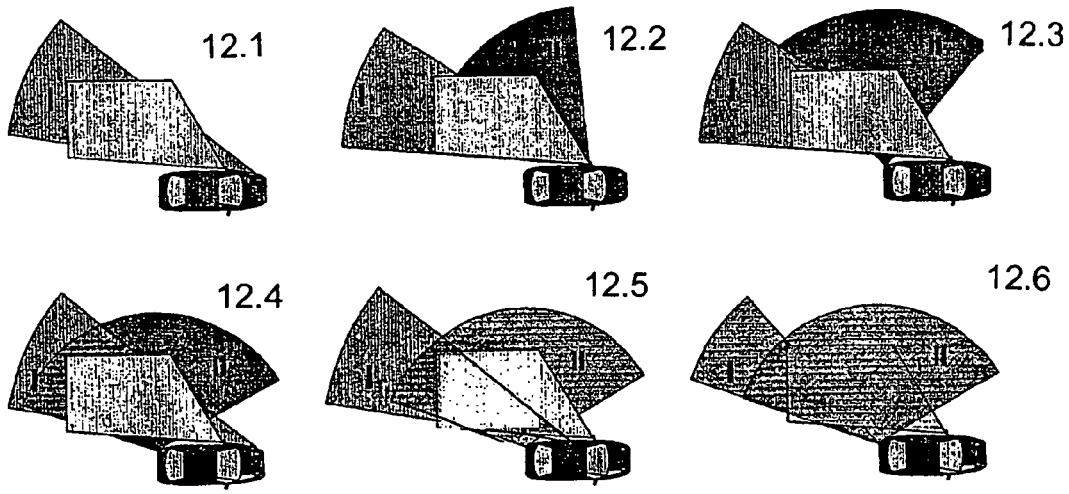
FIG. 13
| Arrangement | Beam I | | Beam II | |
|---|---|---|---|---|
| | Width/Tilt | Installation Site | Width/Tilt | Installation Site |
| Fig. 12.1 | 40°/10° | front wheel house | - | - |
| Fig. 12.2 | 40°/5° | mirror/fender | 80°/5° | mirror/fender |
| Fig. 12.3 | 40°/5° | mirror/fender | 80°/50° | rear bumper |
| Fig. 12.4 | 40°/10° | rear wheel house | 130°/20° | rear bumper |
| Fig. 12.5 | 40°/10° | B-pillar side sill | 130°/20° | rear bumper |
| Fig. 12.6 | 40°/10° | rear bumper | 130°/20° | rear bumper |

BLIND SPOT SENSOR SYSTEM

BACKGROUND OF THE INVENTION

Field of the Invention

The present invention relates to a blind spot sensor system which is used to detect and/or classify objects in a defined monitoring region of a motor vehicle using radar technology, said blind spot sensor system comprising at least one first means for emitting a first radar beam as well as a second means for emitting a second radar beam.

The provision in motor vehicles of so-called blind spots monitoring systems which inform the driver of the presence of objects in the region of the so-called "blind spot" of the wing mirror, is known. Modern systems should be able to distinguish here between objects that are relevant for the function (moving motor vehicles, lorries, motorbikes, etc.) and objects that are not relevant for the function (infrastructure such as road signs, traffic lights, etc., crash barriers, parked motor vehicles, etc.). Requirements in this connection exist therefore in the detection, positioning and classification of road traffic objects with reference to a defined monitoring region, which typically covers the region bordering the wing mirror of a motor vehicle and includes the side of the motor vehicle region. If there is a relevant object within the monitoring region, the driver is warned of this.

In prior art a variety of approaches to solving the problem are known. The simplest technical solution lies in the use of curved wing mirrors, which minimize the region that is not covered by the mirror. This solution is, however, forbidden in the USA for example, moreover the curvature of the mirror causes distortions, which makes it difficult for the driver to estimate how far away the object is using the mirror image.

Another approach to solving the problem is to detect the relevant objects using sensors and to inform the driver on the basis of the processed sensor information.

The sensors used for this differ in their physical detection principles and also in the object characteristics measured. In this respect, solutions based on infrared known are, i.e. laser diodes, camera based solutions with corresponding image processing or also radar based systems.

In this way, the different sensors have different advantages and disadvantages relevant to the application that must be taken into consideration in a blind spot system design. When selecting sensors, one must therefore take boundary conditions into consideration, such as system integration, system monitoring region, price, performance, etc.

Road users that actively participate in the road traffic (moving cars, lorries, etc.) are to be classified as relevant for at blind spot system. Static objects and objects that do not actively participate in the road traffic (roadside development, parked motor vehicles, etc.) must, on the other hand, be regarded as non relevant by the blind spot system. If there is a relevant object within the monitoring region, then a blind spot system should signal this. If, on the other hand, the object in question is not relevant, there should be no reaction from the system.

The monitoring region in which the objects are to be recognized is typically defined by a zone beginning behind the wing mirror of a motor vehicle (cf. area with lighter background in FIG. 1).

This zone covers the adjacent lane and extends back to a maximal distance behind the motor vehicle equipped with a blind spot system.

In particular, the monitoring region covers the "blind spot" of the wing mirrors of the motor vehicle. It is, as a rule, useful to fit both sides of the motor vehicle, i.e. right and left wing mirror, with such a blind spot system, as the stated problems can occur both when there is a lane change to the left-hand lane as well as to the right-hand lane.

The classification of a detected object as relevant or non relevant can preferably depend inter alia on the movement status of the object relative to the motor vehicle.

If a motor vehicle equipped with a blind spot system (referred to in FIG. 2 and the other figures as "host car") moves in a coordinate system along the x-axis at a positive speed, then in terms of the system function, objects—such as are shown, for example, in FIG. 3—must be classified as relevant or non relevant, whereby the speeds named there, $v_0$ and $v_1$ are each application measurements.

The system functionality of a "blind spot monitoring" application is thus to warn the driver of a motor vehicle of the existence of a relevant object which is on an adjacent lane in the region that is difficult for the driver to see into, which region is to the lateral rear and adjacent to his own motor vehicle, i.e. within the above defined monitoring region. The system function is thus intended to assist the driver, in particular during a lane-changing maneuver.

Typical application cases of a "blind spot monitoring" system are described below, and the respective desired system reaction is explained.

In the first case (see FIG. 4) the motor vehicle (represented in dark tone) equipped with a blind spot system is positioned on a multi-lane carriageway and is being overtaken on the left-hand lane by a motor vehicle (shown in light tone).

FIGS. 4.1 to 4.6 show the chronological sequence of the scenario, wherein the activated or deactivated "warning lights" shown above the individual figures represent a preferred desired system reaction.

"Activated" (cf. FIGS. 4.2. to 4.5.) means here that there is a relevant object within the monitoring region and that it has been recognized—the driver is warned. "Deactivated" (cf. FIG. 4.1. and FIG. 4.6.) means here that there is no relevant object in the monitoring region—no warning whatsoever is issued.

In the scenario shown in FIG. 4, the object to be detected enters the monitoring region in the direction of travel from behind, stays a certain time in the region and finally leaves it in the direction of travel forwards. Comparatively high relative speeds can occur here between the objects in this configuration, if the overtaking motor vehicle is approaching at a high difference speed, in such a case, however, the use of the system is questionable, as the time duration, in which a warning is given to the driver must not fall below a minimum time (approx. 1 s), to allow the driver time to react. Objects that enter the monitoring region from behind could thus result in a short system reaction time.

FIG. 5 shows a further application case, namely the overtaking maneuver on the right-hand lane. The motor vehicle (each shown in dark tone in FIGS. 5.1. to 5.6.), equipped with a blind spot system, passes a relevant object (for example a moving motor vehicle—represented in light tone) on the right-hand side, said relevant object being on the left adjacent lane.

In this case the relevant object enters the monitoring region in the direction of travel from the front. In such a scenario, a warning is only useful if the motor vehicle that was overtaken remains in the monitoring region a certain minimum period of time.

Another scenario in which a blind spot functionality is desirable, is the case in which a relevant object approaches from the side of the monitoring region (cf. FIG. 6).

In this case of the so-called cutting-in maneuver, the relative speeds occurring are much less than before in the cases described for FIGS. 5 and 6. It follows from that, that objects entering the monitoring region from the side permit a tolerably longer system reaction time.

When listing the typical application cases where a blind spot system is applied one should not just discuss scenarios that require a positive system reaction, but also such cases that are not supposed to trigger any kind of system reaction.

The following scenarios show typical cases that occur very frequently and should not cause a blind spot system to trigger a warning:

In the scenario represented in FIG. 7 a motor vehicle ("host car") equipped with a blind spot system is being overtaken by an object on the next but one lane. As at no time is there a relevant object in the monitoring region, a blind spot system should not emit any warning stimulus where positioning is horizontal to the monitoring region.

A further scenario that occurs frequently is the approach of a relevant object in one's own lane (cf. FIG. 8).

In this case, a blind spot monitoring system should also not emit any warning, as once again there is no relevant object in the monitoring region.

A further scenario that can occur frequently is the case in which a non relevant object enters into the monitoring region of the "blind spot detection" system.

FIG. 9 depicts the approach to a carriageway or road boundary, i.e. to a static object such as that of a crash barrier or a wall. Here a blind spot system should be able to detect the road boundary and to categorize it as not relevant, i.e. said blind spot system should be capable of classifying objects. Again, no warning should be generated in such a scenario. Based on desirable system reactions and the typical application cases, the object underlying the invention is to provide a blind spot sensor system that fulfils the requirements as described in the introduction. In particular, the blind spot sensor system should:

have a high detection probability for the objects that are to be detected;
allow determination of the relative speed of the object;
permit a determination of the object position relative to the monitoring region, i.e. whether an object lies inside or outside the region, an object not necessarily having to be positioned precisely within the region; and/or
classify the detected objects as relevant and non relevant.

Furthermore, optionally, a classification of the driving environment of the motor vehicles can be useful for the system function.

Further, the required performance is to be so designed that alarm error and false alarm rates are kept to an acceptable range.

Finally the blind spot sensor system should be suitable for the automotive environment, i.e. meet the usual requirements in respect of robustness, infrastructure, environmental conditions, size, ability to be integrated, etc.

SUMMARY OF THE INVENTION

This object is achieved by means of a blind spot sensor system with the features as claimed in claim 1.

Advantageous formations and developments that can be used on their own or in combination with each other are the subject of the dependent claims.

The invention is based on generic type blind spot sensor systems for detecting and/or classifying objects in a defined monitoring region of a motor vehicle, said blind spot sensor systems comprising at least one first means for emitting a first radar beam as well as a second means for emitting a second radar beam, and hence based on that the radial field of vision of the first radar beam (beam I) leans towards the direction of travel ($v_x$) of the motor vehicle and the radial field of vision of the second radar beam (beam II) is oriented essentially vertically to the direction of travel ($v_x$) in such a manner that the fields of vision of the radar beams (I and II) at least partially overlap and cover, essentially the measurements of the monitoring region; whereby at least the first radar beam (beam I) can be actuated in both the CW modulation mode as well as in the FMCW modulation mode.

The realization of a blind spot sensor system having at least two, in part specially actuated, radar sensors, has the particularly relevant advantages mentioned below:

a high detection probability for the objects to be detected (lorries, cars, crash barriers, etc.) which have an adequate structure and are made at least for the most part from metal;
Insensitivity to partly extreme environmental conditions such as changing light conditions, temperature fluctuations from −40° C. to +85° C. and more, rain, snow, etc.;
precise determination of radial speed and distance of the objects detected;
the possibility of object classification using typical structure and material-dependent components in the radar signals; and/or
the possibility of pattern recognition using typical structure and material-dependent components in the radar spectrum.

As radar sensors can, moreover, be incorporated so as to be invisible behind materials, such as plastics, that are "transparent" for radar beams, and in addition have a proven robustness and infrastructure, the present invention is particularly suitable for application in modern motor vehicles.

According to a first simple embodiment CW and FMCW modulation modes alternate sequentially.

In order to increase detection probability and for more precise determination of the speed of the object, there is provision that several FMCW modulation modes alternate with at least one CW modulation mode, in particular five FMCW modes to one CW mode.

To avoid measuring inaccuracies, in particular in the CW modes, it is proposed that several FMCW modulation modes follow at least two CW modulation modes, preferably five FMCW modes to two CW modes.

In a simple embodiment of the invention, a 2-beam sensor is used as the means for emitting the first and second radar beam. Against the advantage of close vicinity communication, there is the disadvantage of relatively large installation space.

As, depending on the type of motor vehicle, small-dimensioned components are increasingly relevant, it is proposed that a 1-beam sensor is used as the means for emitting the first and second radar beam. Such separations, moreover, allow, advantageously, new types of sensor arrangements.

While 2-beam sensors must be mounted for example in the wing mirror, in the fender or in the rear bumper, 1-beam sensors can be combined as desired. According to the invention, for example, preferably the 1-beam sensor for the first radar beam (beam I) is mounted in the wing mirror, in the fender, in the front wheel house, in the B-pillar or in the side sill and the 1-beam sensor for the second radar beam (beam II) is mounted in the rear bumper.

Expediently the first radar beam (beam I) has a width of 30° to 50°, in particular one of 40° and a tilt towards the longitudinal axis of the motor vehicle of 2° to 13°, in particular one of 5° or 10° and the second radar beam (beam II) a width of 70° to 140°, in particular one of 80° or 130° and a tilt towards the longitudinal axis of the motor vehicle of 2° to 53°, in particular one of 5°, 20° or 50°.

As is explained by way of example below and with reference to the accompanying drawings and using preferred embodiments, the present invention is particularly suitable for detecting and/or classifying objects in a defined monitoring region of a motor vehicle, in which;

BRIEF DESCRIPTION OF THE DRAWINGS

FIG. 1 shows a schematic representation of the typical monitoring region of a "blind spot monitoring system;

FIG. 2 shows a schematic representation of the definition of a motor vehicle with a blind spot system in the coordinate system;

FIG. 3 shows a schematic representation of examples of relevant and non relevant objects;

FIG. 11 shows a schematic representation of two installation situations of the blind spot sensor system behind the motor vehicle bumper for the left-hand side of the motor vehicle;

FIG. 12 shows a schematic representation of further (alternative) arrangements of the sensors for the blind spot monitoring application;

FIG. 13 shows a schematic representation of further details and specifications of the individual arrangement represented in the FIGS. 12.1 to 12.6;

DESCRIPTION OF THE PREFERRED EMBODIMENTS

Just as with the figures described in the introduction, the same or comparable components are similarly represented in the following description of the preferred embodiments of the present invention.

Figure 4:
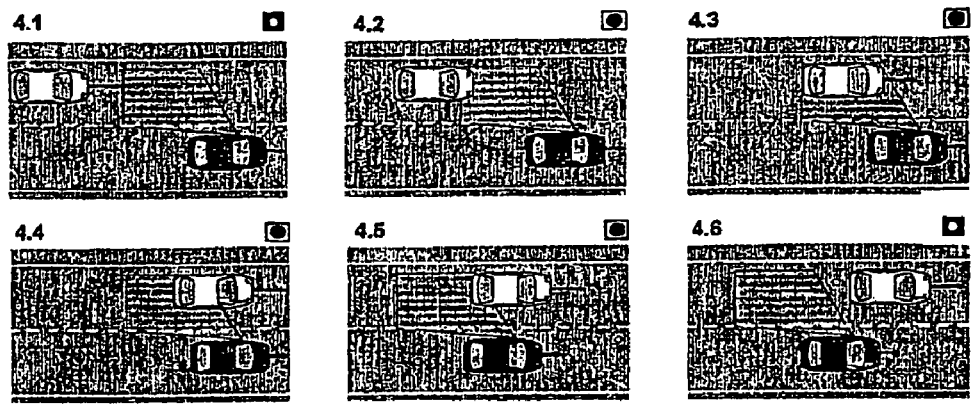
FIG. 4 shows a schematic representation of an overtaking maneuver on the left adjacent lane.
Figure 5:
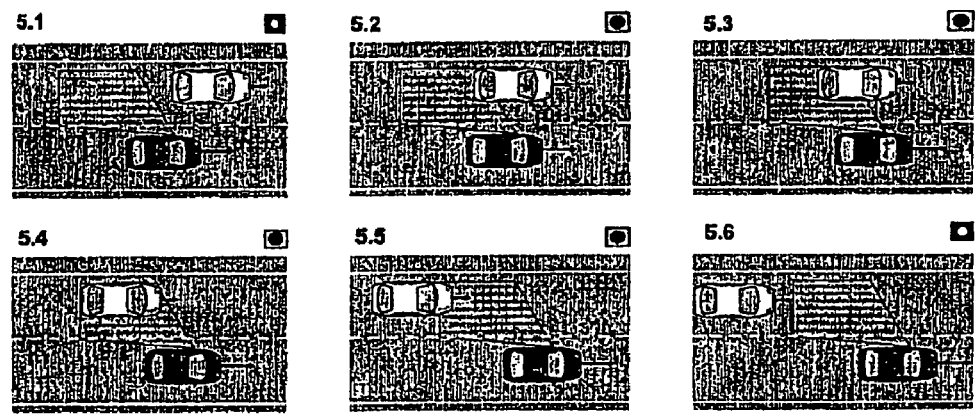
FIG. 5 shows a schematic representation of an overtaking maneuver on the right-hand lane.
Figure 6:
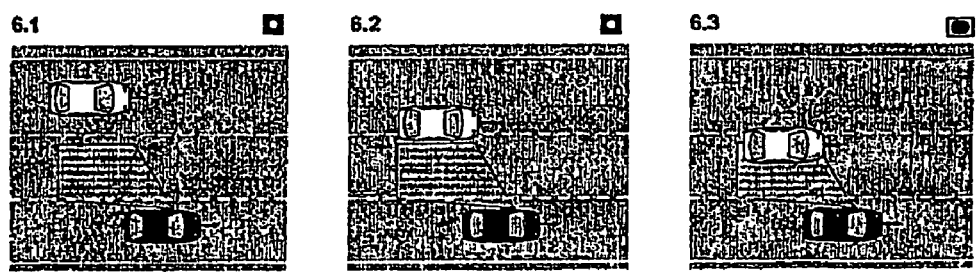
FIG. 6 shows a schematic representation of a cutting-in maneuver.
Figure 7:
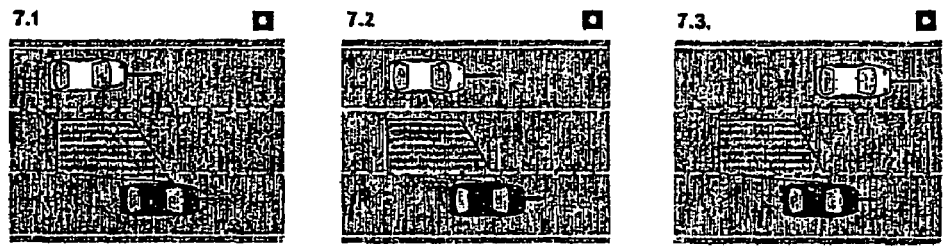
FIG. 7 shows a schematic representation of an overtaking maneuver on the next but one right hand lane.
Figure 8:
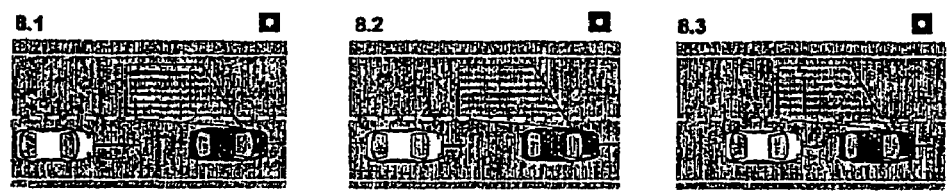
FIG. 8 shows a schematic representation of the approach of a relevant object on the same lane.
Figure 9:
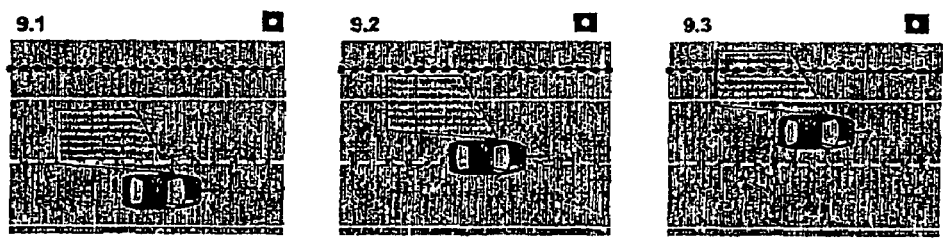
FIG. 9 shows a schematic representation of the approach of the "host car" on a carriageway boundary.
Figure 10:
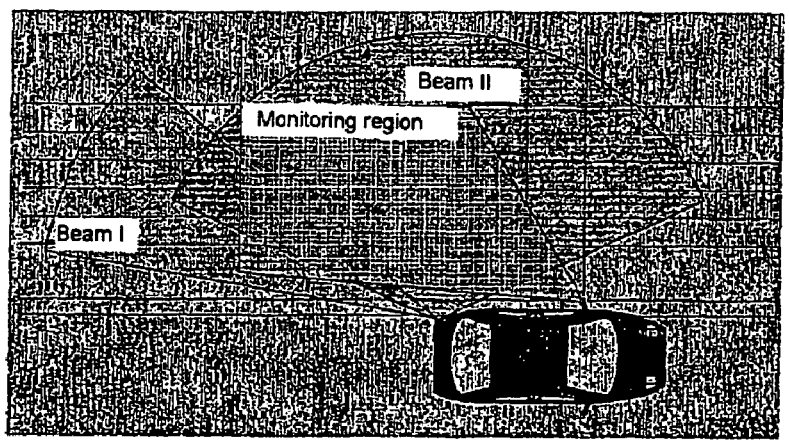
FIG. 10 shows a schematic representation of the exemplary arrangement of two partially overlapping fields of vision of the radar sensors of a "blind spot monitoring" system according to the invention.

FIG. 10 shows a typical arrangement of the two radar beam ranges. Beam I covers a sector of approx. 40° in the horizontal plane of the adjacent carriageway. Said section is tilted by approx. 10° relative to the lengthwise direction of the motor vehicle. Beam II has a sector of approx. 130° and is oriented vertical to the lengthwise direction of the motor vehicle. The monitoring region that must be covered, and in which the objects should be detected and classified, is marked in a lighter tone.

The beam widths and beam orientations chosen here are designed for the desired monitoring region (lighter background). An otherwise defined monitoring region, would require beam width and beam orientation to be adjusted. The basic design and configuration of both beam ranges would, however, be the same and are necessary so as to be able to apply the strategies/solutions of the subrequirements for the signal evaluation described below.

The proposed sensor system is based on the preferred use of 24 GHz, possibly also 77 GHz, radar sensors. Radar beaming with a corresponding wavelength of a few millimeters has the advantageous characteristic of being able to pass through a large number of plastic materials without any significant interference. As the majority of vehicle safety-bumpers are currently manufactured from plastic, this presents the opportunity for the inventive blind spot sensor system to be mounted behind the rear bumper. It is thus hidden from view and protected from outside influences such as stones thrown up. At the same time, this is not an insignificant advantage in the system integration compared with other sensor concepts such as video, infrared, laser.

The field of vision required by the radar beams allows the use of both a dual-beam sensor and also two single-beam sensors. The first variant has the clear advantage that only one housing with a corresponding infrastructure is required. However, the required field of vision then sets narrow limits on the installation site of the sensor.

If two single-beam sensors are used, then one needs in addition a sufficiently powerful interface between the two sensors. But then if two sensors are used one has a lot of flexibility as to the possible installation sites for the individual sensors as the single-beam sensors are markedly smaller (about half as big) than one dual-beam sensor.

Typical installation situations for the proposed sensor configuration are represented in FIG. 11. This sensor configuration was primarily chosen on the basis of two different kinds of considerations. On the one hand, it should be possible to integrate the system, for example, into a car. When 24 GHz radar sensors are used, the required antenna area limits the sensor dimensions. For a dual-beam sensor shown in FIG. 11.1 having the field of vision shown in FIG. 10, the required antenna area is about 150×60 mm. Because of the required orientation of the sensor and its size, in a conventional car one can only find a limited number of suitable installation sites.

If one considers two separate sensors (see FIG. 11.2) to realize the monitoring region, this simplifies in an advantageous way the integration of the sensors into the motor vehicle in the sense that the separate sensors can be dimensioned correspondingly smaller, even if a sufficiently fast communication between the two separate sensors is required.

Alternatively to the arrangement presented in FIG. 11, it is possible to use alternative beam configurations with corresponding installation sites on the motor vehicle with a given monitoring region.

FIG. 12 shows possible beam arrangements for a blind spot sensor system for a given monitoring region (light background). FIG. 12.1 shows the classic arrangement with only one radar beam, which is known from prior art.

FIG. 12.2 to 12.6 show beam arrangements according to the invention, with which arrangements the signal processing strategies described below can be used, whereby, further details and specifications of the individual arrangements represented in FIGS. 12.1 to 12.6 are set down in FIG. 13. Detection, classification and pattern recognition strategies that can be used alternatively or cumulatively in the realization of the inventive blind spot sensor system, are described in detail and their application is discussed using a subrequirement they are based on respectively.

Subrequirement A—Separation of object and environment/object positioning. The object recognition and classification should preferably be carried out using a dual-beam radar sensor. The sensor has no angle resolution at all inside the two beam lobes, they measure exclusively radial distances and speeds in the field of vision of the radar lobes. However, the objects are to be positioned relative to a preset monitoring region. In the typical application case, the separation of the relevant objects from the environment poses a further requirement as in the typical application case a distinct multi-target environment prevails (e.g. motor vehicle beside crash barrier):

The inventive blind spot system carries out the object positioning and the object recognition through a targeted arrangement and alignment of the two fields of vision of the sensor(s).

To enable the entire monitoring region to be covered one requires a sensor that has a very extensive horizontal field of vision. In the configuration presented this is realized by beam II of the sensor, which beam has an aperture angle of approx. 130° in the horizontal plane (see FIG. 10). The blind spot sensor system is designed in particular for use on multilane, mainly structurally limited carriageways (e.g. motorway with crash barrier boundary).

For a sensor that is aligned in an exclusively vertical manner in relation to the direction the motor vehicle is moving in (beam II), this presents a distinct multi-target environment.

As in particular every metallic object results in a detection, timely recognition and classification of objects in a multi-target environment of this kind is very difficult.

Figure 14:
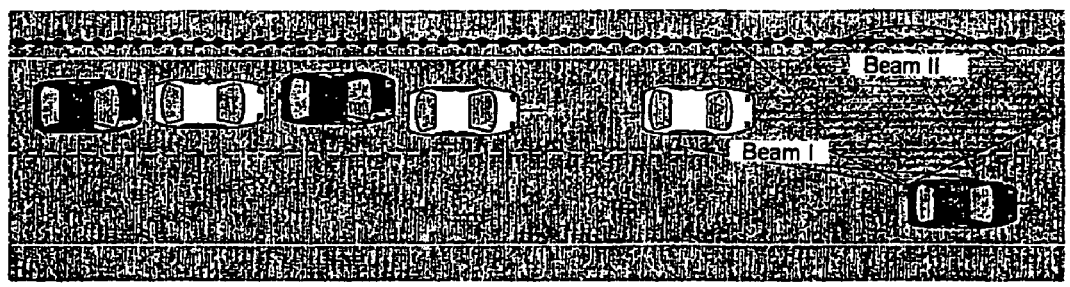
FIG. 14 shows a schematic representation of the schematic representation of a first typical motorway scenario.

By way of illustration, a typical motorway scenario is to be discussed. The motor vehicle (host car) equipped with the blind spot sensor system is driving on the right-hand lane of a two-lane motorway, the second lane of said motorway being bordered by a crash barrier. The motor vehicle is overtaken by five motor vehicles in succession. FIG. 14 shows a schematic representation of the scenario.

Figure 15:
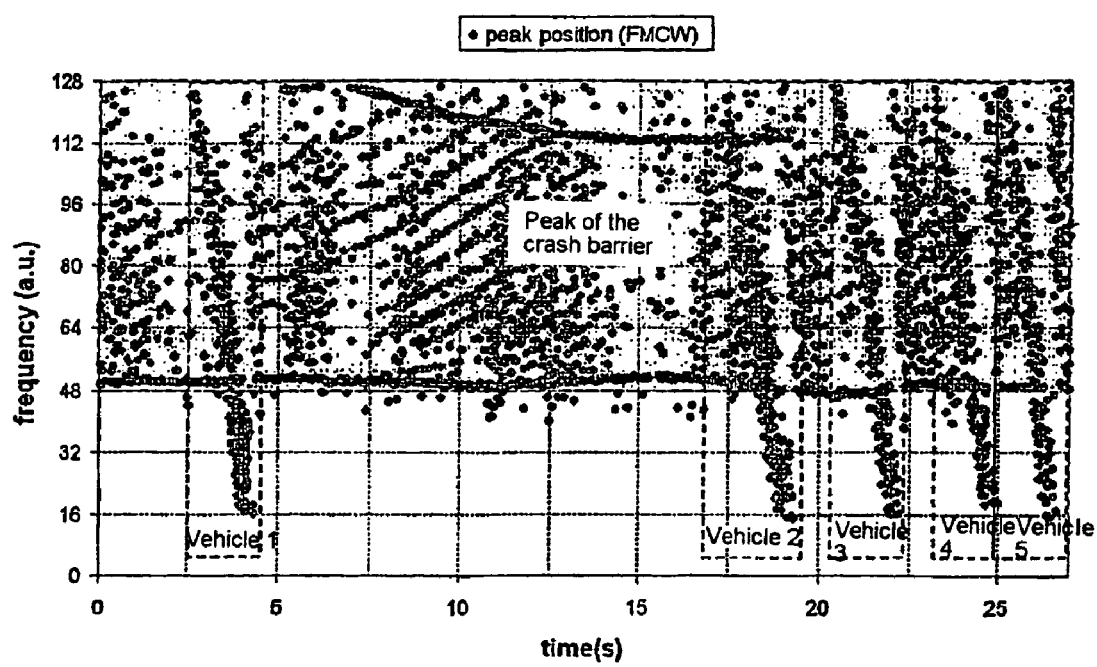
FIG. 15 shows a schematic representation of the FMCW peaks in beam II corresponding to the scenario represented in FIG. 14.

FIG. 15 shows the FMCW peaks in beam II corresponding to the scenario represented in FIG. 14, i.e. the detected frequency maxima (peaks) in the FMCW radar spectrum of beam II are represented, wherein peaks that must be assigned to the overtaking motor vehicles are identified by Fzg, so that the remaining peaks must be assigned to the crash barrier.

As inherent to the FMCW radar principle, the individual frequency position is hereby proportional to the radial object distance and speed of the respective reflex point on the object.

Because of the large aperture angle in beam II (±65°), both the crash barrier boundary and metal posts of said barrier and also the overtaking motor vehicles fall into the monitoring region of the sensor.

As the sensor only measures radial dimensions and there are a very large number of targets with comparable distance and relative speed in the monitoring region, it is only reliably possible to separate the relevant objects (motor vehicles) from the non relevant objects (such as crash barrier posts) using beam II when in this scenario the radial distance of the relevant objects is clearly smaller than the smallest radial distance of the non relevant objects.

This is not adequate for a reliable and timely recognition and classification of the objects!

In order, nevertheless, to be able to carry out a timely object recognition and classification,—as already mentioned—an arrangement is proposed, said arrangement consisting of two partially overlapping sensor monitoring regions.

The strategy consists in cutting out the crash barrier bordering the adjacent lane through targeted selection of the field of vision of beam I and of its orientation in relation to the motor vehicle.

The detection range of beam I is chosen in such a way that it mainly monitors the adjoining lane and is hence not influenced by the crash barrier or similar non relevant objects.

Figure 16:
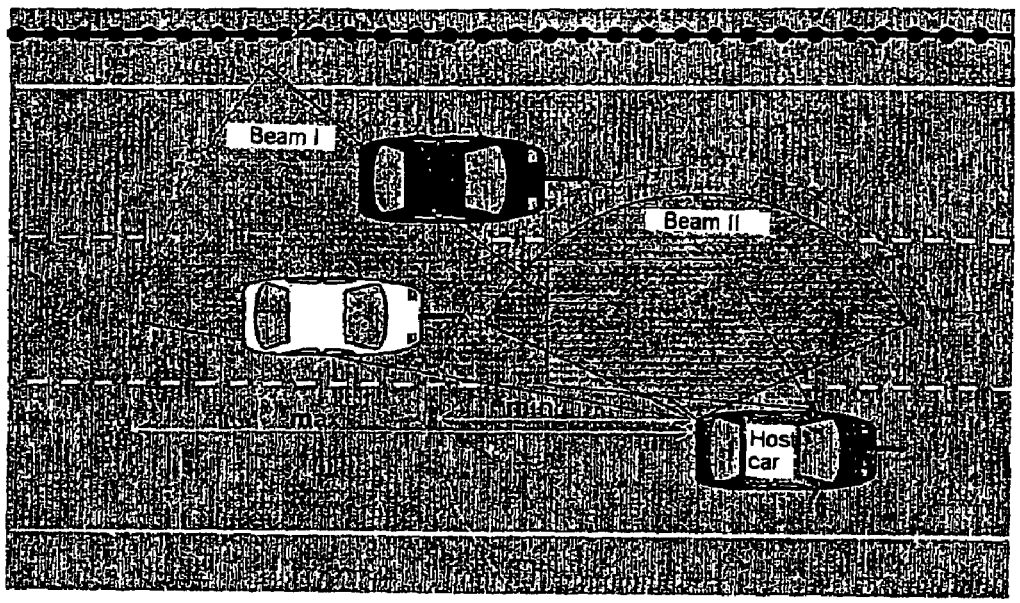
FIG. 16 shows a schematic representation of an object recognition and positioning where there is an approach from behind.

Objects that are detected with a defined radial distance in beam I, are on the adjoining lane and must be classified as possible relevant objects. The geometric relationships are represented schematically in FIG. 16.

The given radii $r_{max}$ and $r_{min}$ depend on the choice of the beam width and the orientation of beam I. Hereby the sector between $r_{max}$ and $r_{min}$ represents an area in which the targets must be recognized and their signals are tracked in the radar spectra.

The decision as to whether the object is on the adjacent or the next but one lane is made when the object trace falls below the radial distance $r_{min}$. Then the positioning is carried out based on the radial position determination in beam II.

From the geometry of the beam lobes of beam I and II, it is clear that both beams are required to enable an object to be positioned in relation to the monitoring region. Because of the overlapping of ranges, objects from beam I continue to be tracked in beam range II until it leaves the monitoring region.

The system described uses beam I to carry out early recognition of objects. This is useful as, in the application described, objects with a high relative speed approach the system from behind, i.e. from the line of vision of beam I. It is precisely in this direction that the system must be able reliably to recognize objects with a high relative speed.

Figure 17:
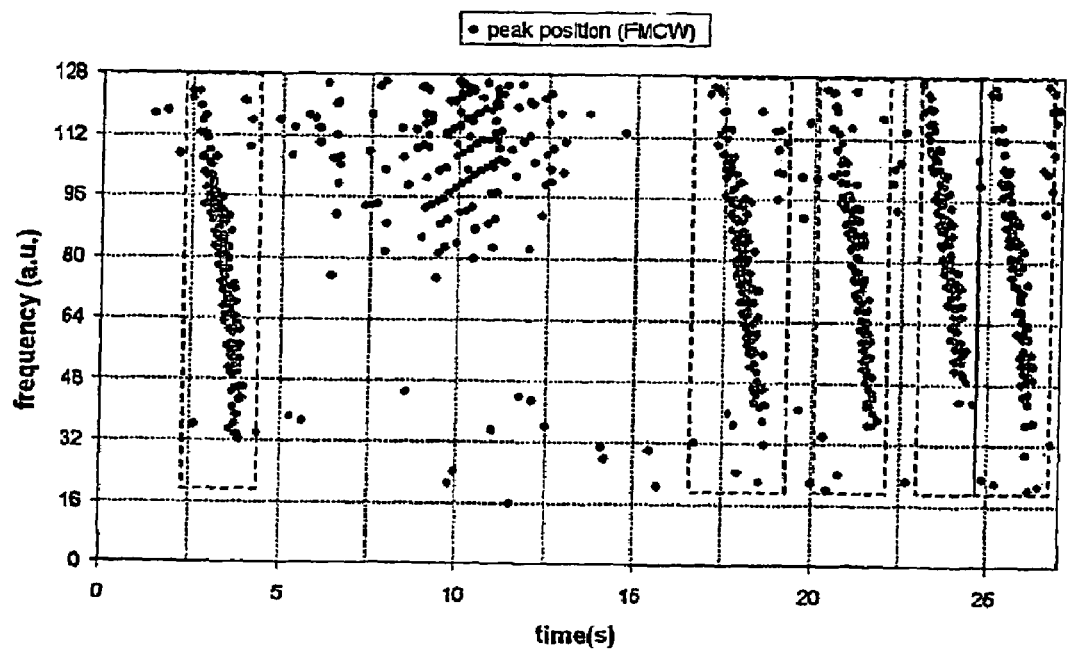
FIG. 17 shows a schematic representation of the FMCW peaks in beam I corresponding to the scenario represented in FIG. 14.

The detected frequency maxima for the motorway scenario under discussion in beam I are represented in FIG. 17. It is clear that the relevant objects have been clearly separated from the non relevant objects through the choice of beam orientation and beam shape.

In beam I in this scenario it is almost only the relevant objects that can be recognized (e.g. motor vehicles driving past on the adjacent lane). Because of the beam orientation these objects are, however, seen only up to a minimum radial distance. This minimum distance is not sufficient to be able to make statements as to the object position relative to the monitoring region using only beam I.

Consequently, beam I serves for the early recognition of objects that are approaching from behind on the adjacent lane. As the beam ranges overlap, objects that are approaching from behind on the adjacent lane are detected in both beam ranges.

Subrequirement B—Reliable recognition of objects with high difference speed. As already described, the system must be capable of reliably recognizing objects that are approaching the motor vehicle equipped with the blind spot sensor system ("host car") from behind at a relatively high differential speed (approx.>40 Km/h):

The radar sensor used offers, at least for beam I, the possibility of modulation switching, i.e. it can be actuated both in CW modulation mode and in FMCW modulation mode. Both types of modulation have specific advantages and complement each other in the ability to recognize objects, to separate them and also to determine their radial position and speed. In CW mode, the sensor is capable of measuring only the speed of objects in the monitoring region of the sensor. Thus the sensor only measures the presence of objects and their relative speed. Object separation can only be done on the basis of different speed.

Here the speed measuring range is limited to the practical range for the application (approx. 0 . . . 30 m/s). In CW mode, the spatial monitoring region is determined on the one hand by the aperture angle of the antenna and the sensitivity of the sensor (in comparison with the FMCW mode, there is no fixed maximum radial detection range!).

In particular, the radial field of vision for relevant objects (car, lorry, . . . ) is larger than the maximum field of vision, in which a radial position determination can be carried out.

The FMCW mode is advantageous in that radial object distances and also radial relative speeds of objects in the monitoring region can be determined simultaneously.

Here, however, the radial monitoring region is limited by the speed of the object and the radial distance. For objects with relative speed $v_{relative}$=0, the maximum distance is $r_{max}$ (depending on the sensor design). On the other hand, for an object with the relative speed $v=v_0$ only $(r_{max}-k^* v_0)$ (k>0), and is thus correspondingly smaller.

Moreover, the FMCW signal evaluation has the disadvantage of ambiguities in a multi-target environment. If there is more than one object in the monitoring region of the sensor, then the radial distances and speeds of the objects cannot be uniquely determined in a single FMCW measuring cycle. As a consequence of this, FMCW data can be misinterpreted and virtual objects (ghost targets) are created.

In principle, the FMCW mode offers the possibility of separating objects by distance and speed.

The sequential operation of the CW and FMCW radar modulation method allows the advantages of both methods to be combined and synergy effects to be exploited.

The high sensitivity of the CW mode allows the speed of objects (in particular of objects with a high relative speed) to be determined at a very early point in time. Thus objects are recognized early and the FMCW mode signal processing can be specifically sensitized to the presence of objects with the detected speed of the object in CW mode.

In this way, the position and speed of objects can be determined with certainty at a very early stage and ambiguities in the FMCW signal processing can be avoided.

Figure 18:
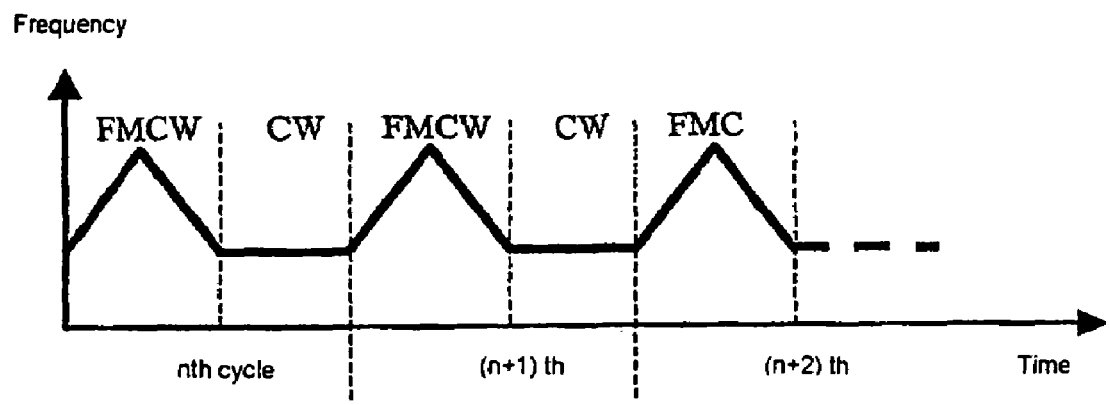
FIG. 18 shows a schematic representation of the possible sequence of the CW and FMCW frequency modulation during the sensor's measuring cycles.

FIG. 18 shows the possible sequence of the CW and FMCW frequency modulation during the measuring cycles of the sensor.

Figure 19:
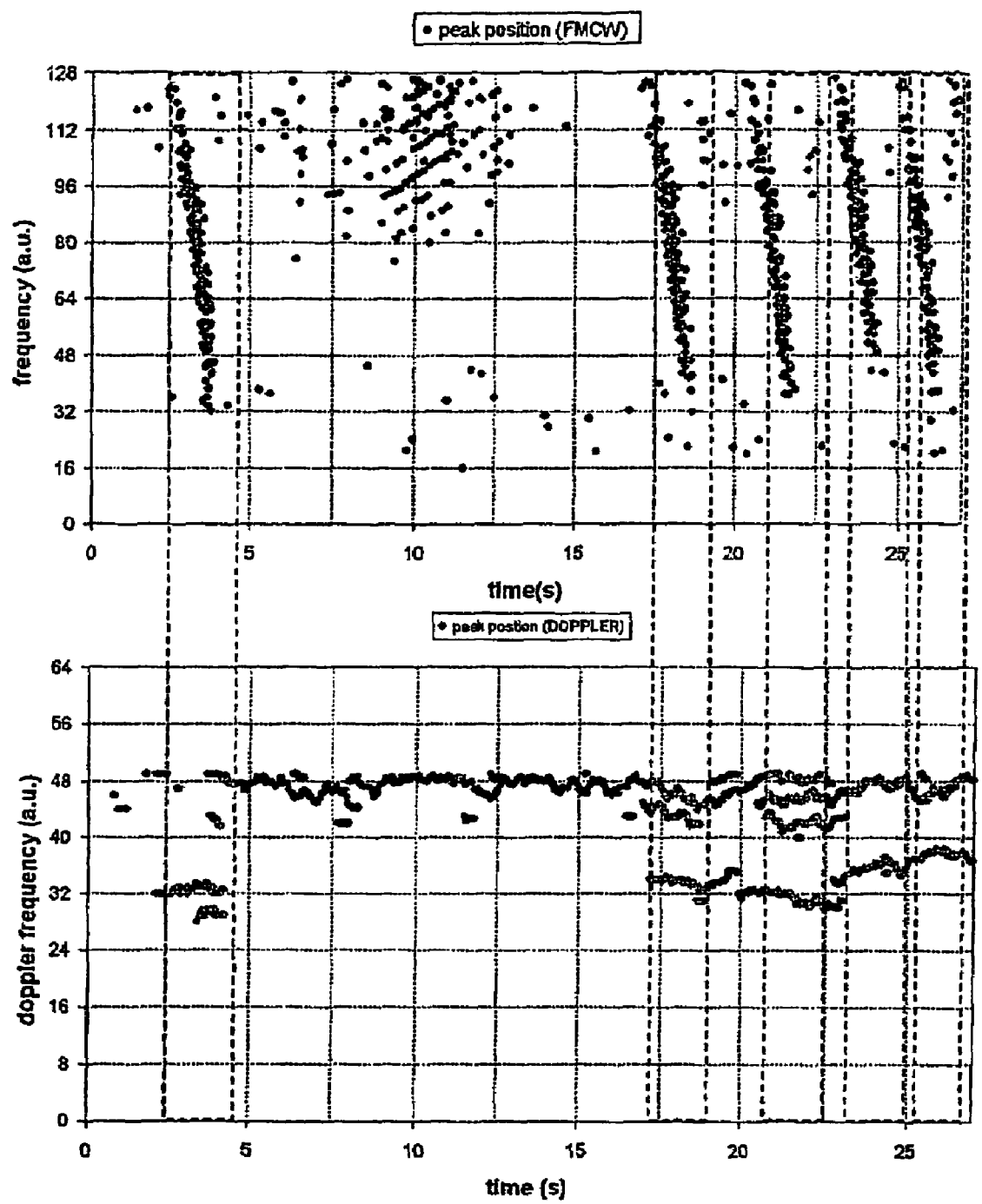
FIG. 19 shows a schematic representation of the chronological (sequential) sequence of the FMCW and CW peaks in the beam range I.
Figure 20:
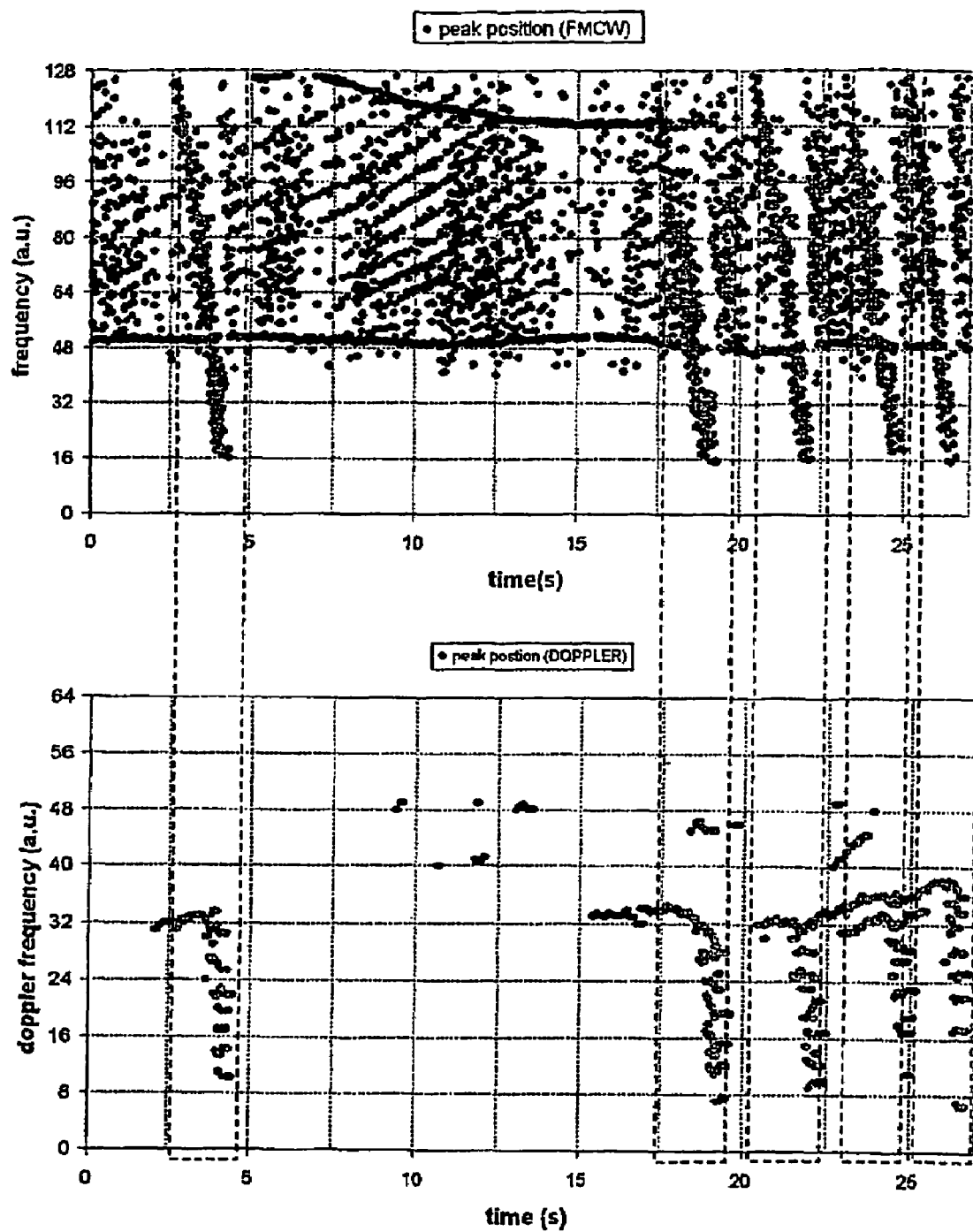
FIG. 20 shows a schematic representation of the chronological sequence of the FMCW and CW peaks in the beam range II.

By way of illustration, the above described motorway scenario is discussed again (see FIG. 14). FIG. 19 and FIG. 20 show the measured FMCW und CW frequency maxima during the scenario as a function of time.

The frequency maxima in CW mode represent the radial relative speed of the objects in the respective beam ranges. In both FIG. 19 and 20 can clearly be seen that object speed in CW mode takes place chronologically before the detection of the object in FMCW mode.

Thus, in the FMCW signal evaluation a targeted search for objects with the CW speed can be made. In this way the radial distance of these objects is determined at a point in time when it would not be for certain possible in a FMCW data evaluation alone.

Figure 21:
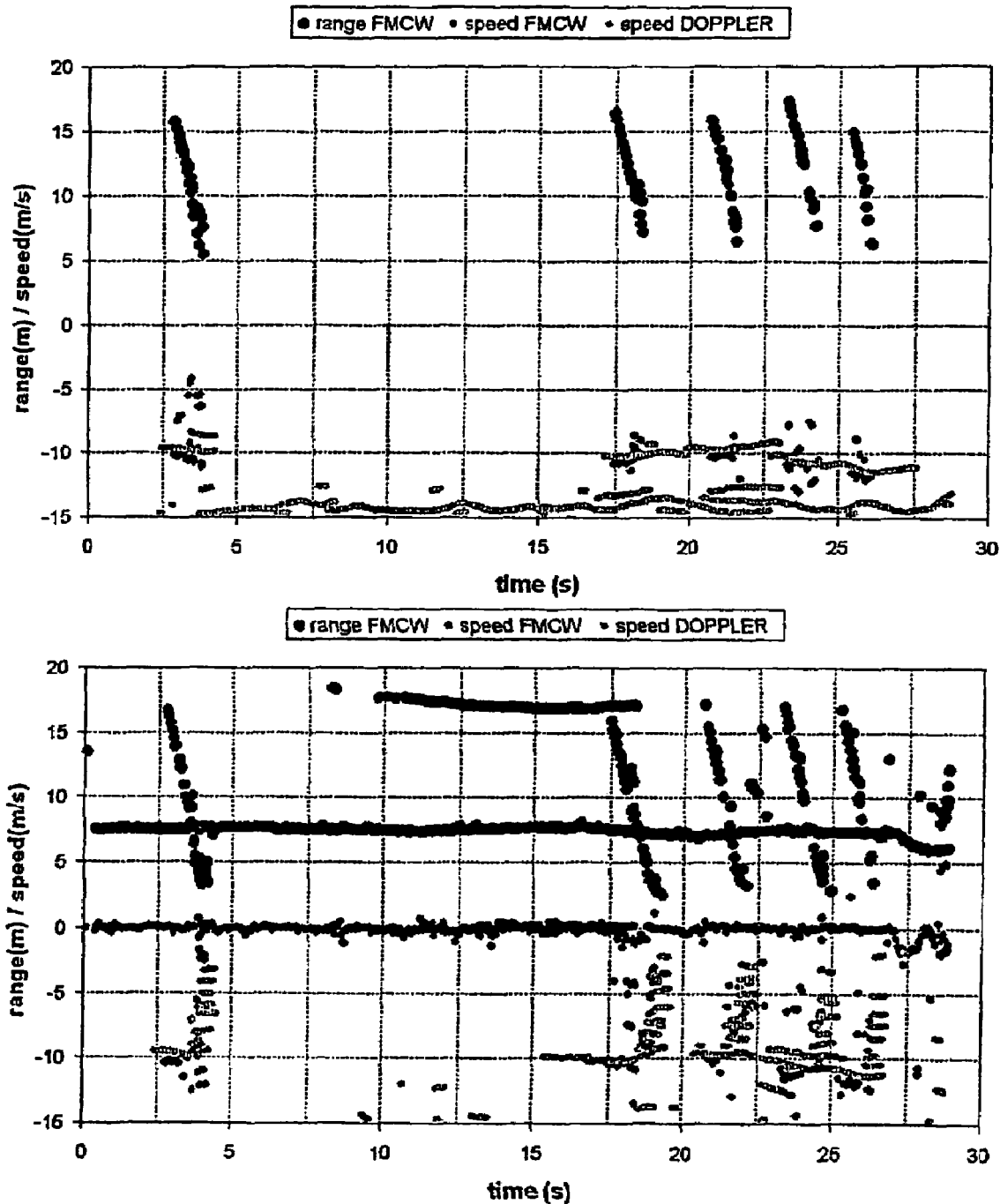
FIG. 21 shows a schematic representation of the detected speed of the object and distance of the object in beams I+II during the motorway scenario according to FIG. 14.

FIG. 21 shows the result of the CW and FMCW data analysis during the motorway scenario under consideration as a function of time. Both the detected speed of the object based on the CW data and the speed based on the FMCW data are shown in both diagrams.

Both methods complement each other in their ability to detect and to classify objects. Because of the principle of measurement, the CW mode is not able to recognize objects that have no relative speed to the sensor.

A typical object that is significant for a blind spot application is the carriageway boundary (crash barrier). In the scenario under consideration, the motor vehicle is moving parallel to this carriageway boundary. Consequently, said carriageway boundary is not to be seen in CW mode in beam I.

Meanwhile, the crash barrier is recognized as a static object in the FMCW mode and can be used for a blind spot application.

Subrequirement C—classification of objects and driving situation into relevant and non relevant objects. In addition to recognizing and positioning the objects relative to the monitoring region, the system must be able to classify objects. As shown in FIG. 3 by way of example, the relevance of an object can be determined inter alia by the relative speed:

As the proposed sensor system is able to determine the speed of motor vehicles that are approaching counter to the direction of travel, i.e. from behind the system, it is relatively easy to classify the objects in these cases.

In contrast, the circumstances are markedly more complicated, when an object approaches the monitoring region from the front or from the side. In this case, the direct measurement of the relative speed is problematic or not possible without a model of the driving environment or other means, for example, a third radar beam directed to the front.

As the absolute movement of the motor vehicle equipped with the system is not known, the movement status of the object cannot simply be inferred from the measured object distances and relative velocities alone.

Figure 22:
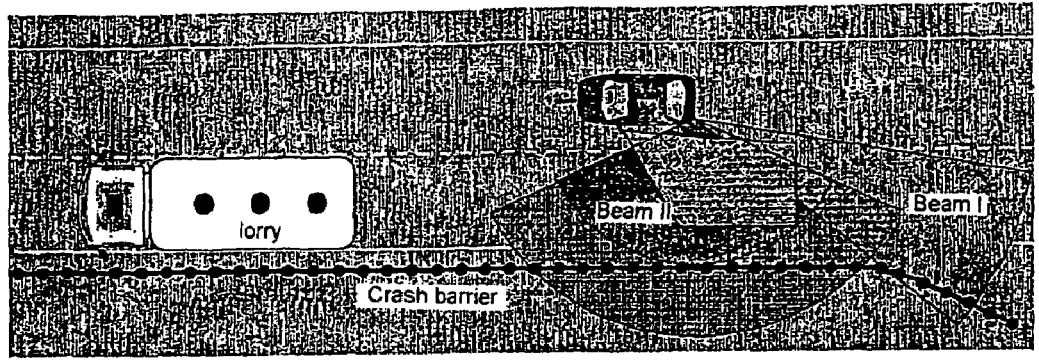
FIG. 22 shows a schematic representation of the schematic representation of a second motorway scenario.
Figure 23:
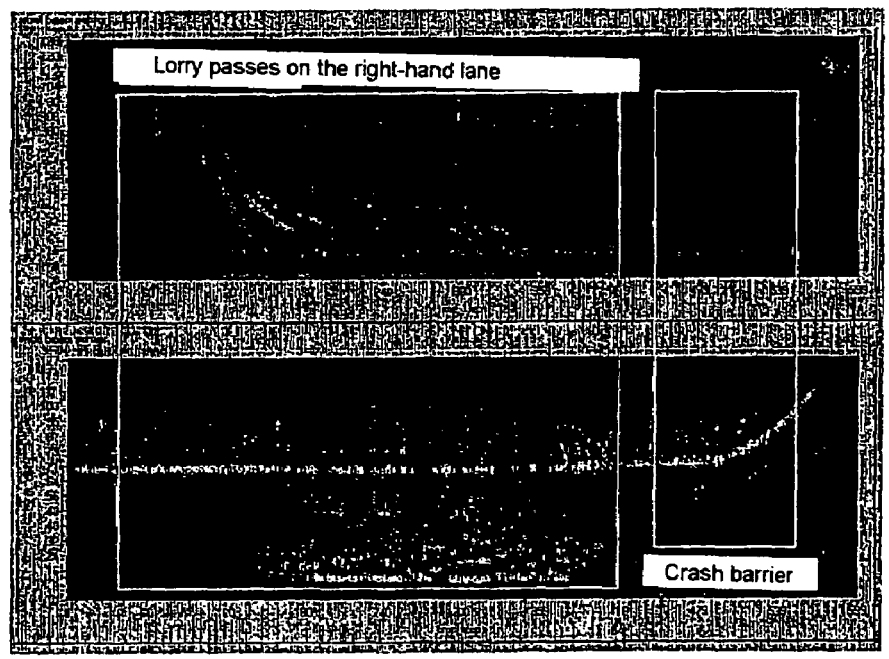
FIG. 23 shows a schematic representation of the radar signals corresponding to the scenario represented in FIG. 22 when approaching a crash barrier and when approaching a lorry.

To illustrate the problem, a second typical motorway scenario is shown in FIG. 22 in which scenario the motor vehicle equipped with the system first approaches a crash barrier and subsequently a lorry. FIG. 23 shows the radar signals, corresponding to the scenario illustrated in FIG. 22, when approaching a crash barrier and when approaching a lorry. The upper diagram shows the FMCW peak positions and the intensity of beam I as a function of time; the lower diagram shows the corresponding information for beam II.

Figure 24:
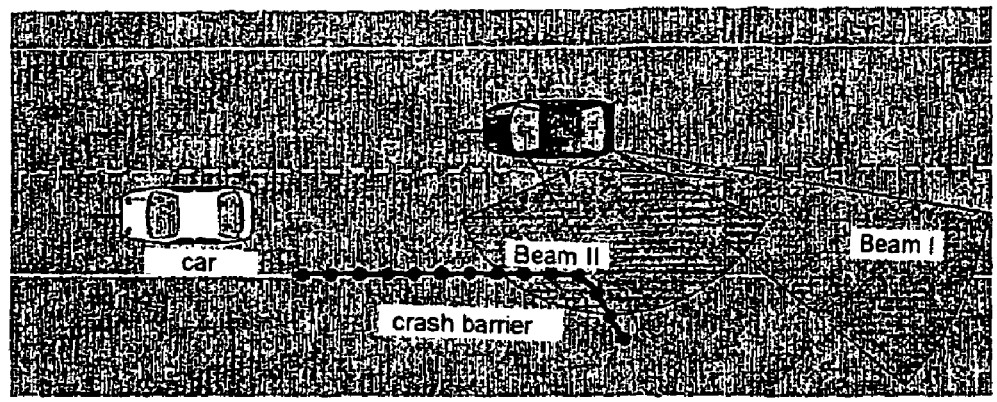
FIG. 24 shows a schematic representation of the schematic representation of a third motorway scenario.
Figure 25:
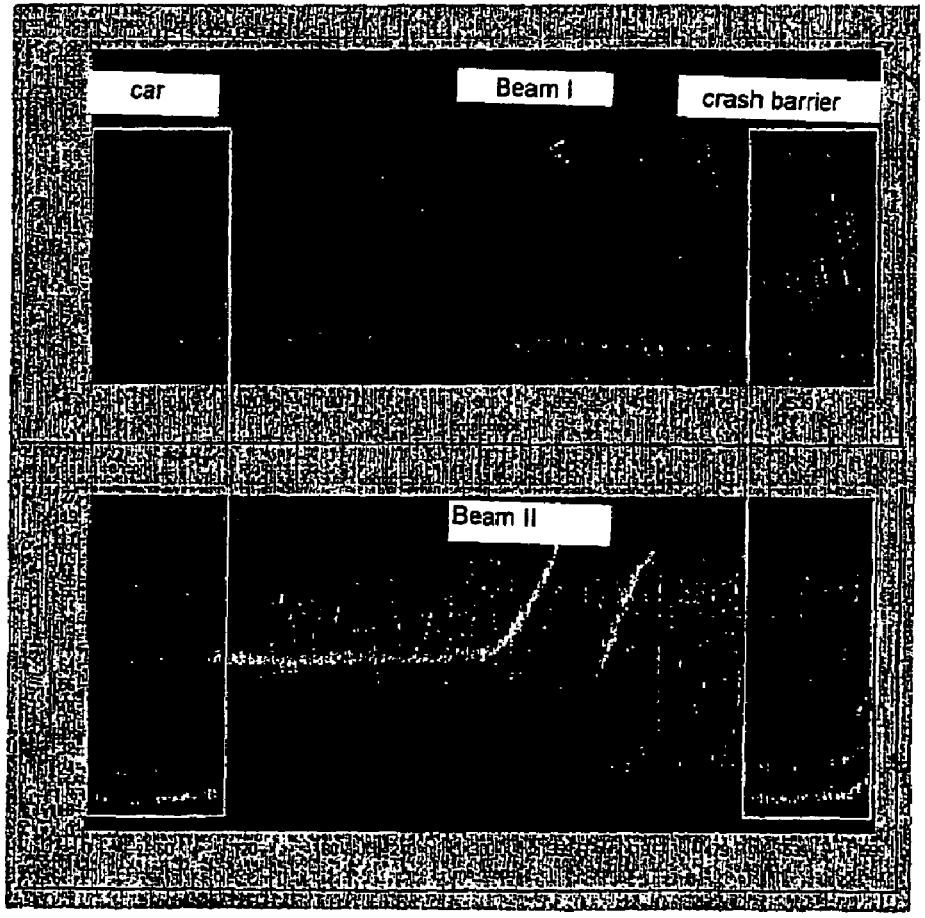
FIG. 25 shows a schematic representation of the radar signals corresponding to the scenario represented in FIG. 24 when passing a crash barrier and when driving parallel to a car.

Likewise to illustrate the problem, a third typical motorway scenario is shown in FIG. 24 in which scenario the motor vehicle equipped with the system is first driving past a crash barrier and subsequently is driving parallel to a car. FIG. 25 shows the radar signals, corresponding to the scenario illustrated in FIG. 24, when driving past the crash barrier and when driving in parallel to the car. The upper diagram again shows the FMCW peak positions and the intensity of beam I as a function of time; the lower diagram shows the corresponding information for beam II.

In the scenarios represented in FIGS. 22 and 23 or 24 and 25, the crash barrier and car or lorry enter the front monitoring region. As both objects are approaching the monitoring region from the front, no object recognition or speed determination can occur in beam range I.

Nevertheless, the system must be able to distinguish between the two objects crash barrier (non relevant object) and lorry (relevant object).

Figure 26:
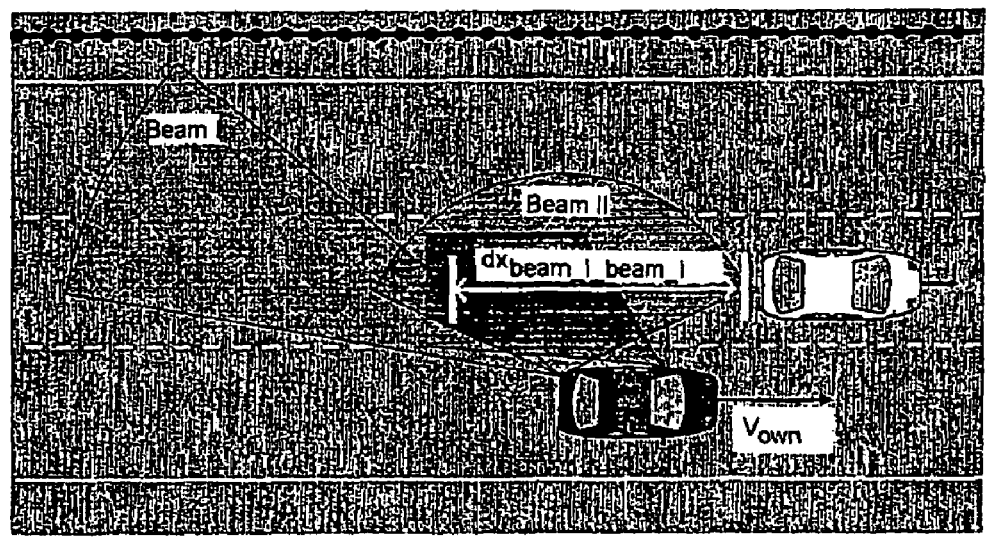
FIG. 26 shows a schematic representation of the classification of objects that enter the monitoring region from the front.

To this end, the following strategies are preferably implemented in accordance with the invention. If the object detected in beam II is a static object, then it will be possible to detect this object in beam I after a time $t_{min}$. This time duration is defined by the own speed of the motor vehicle and the lateral distance of the two beam lobes. Thus, as illustrated in FIG. 26, the following interrelationship applies:

$$t_{min} = \frac{dx_{beam\_I\_beamII}}{V_{own}}$$

If, as a result, an object is recognized in beam II, without this object having already passed through beam range I, then, after the motor vehicle has gone through the stretch $dx_{beam\_I\_beam\_II}$, objects in predefined radial distance in beam I are searched for, and if such an object is detected and if this object has positive relative speed as well, then it can be concluded that it is a static object and hence must be classified as non relevant.

If, on the other hand, no object is detected, it can be assumed that the object is moving along parallel to the motor vehicle equipped with the system and thus, if it is in the monitoring region, must be classified as relevant.

In FIGS. 23 and 25 the recorded FMCW spectra are represented as a function of time for the scenarios described in FIGS. 22 and 24.

Subrequirement D—Pattern recognition in the radar spectrum. In order to obtain additional information about the objects detected, a pattern recognition is carried out in the detected FMCW-spectra of the two radar lobes:

Thereby specific characteristic features of the objects frequently occurring in the FMCW spectrum are searched for, so that, for example, reliable additional information about the detected objects can be obtained by comparing against typical reference patterns stored in a memory.

In particular, the information from the two fields of vision of the sensors (beam I; beam II) are merged to increase the robustness of the classification, or to allow different classes to be differentiated.

Figure 27:
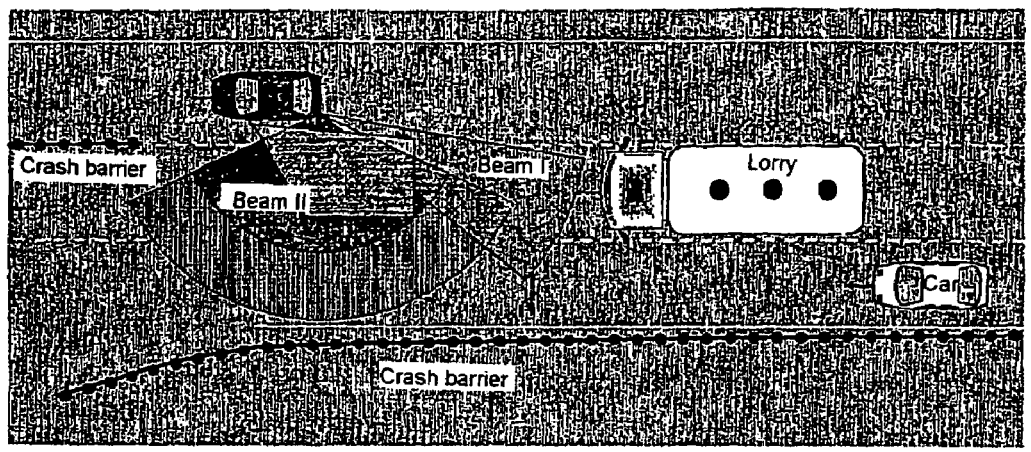
FIG. 27 shows a schematic representation of the schematic representation of a fourth motorway scenario.

In order to illustrate the procedure, it is discussed below using different examples:

FIG. 27 shows a fourth motorway scenario. In this scenario the motor vehicle ("host car") is first overtaken by a lorry on the near left-hand lane. Subsequently, a car passes the motor vehicle on the next but one lane. Finally the motor vehicle drives along by a crash barrier beginning in the monitoring region.

Figure 28:
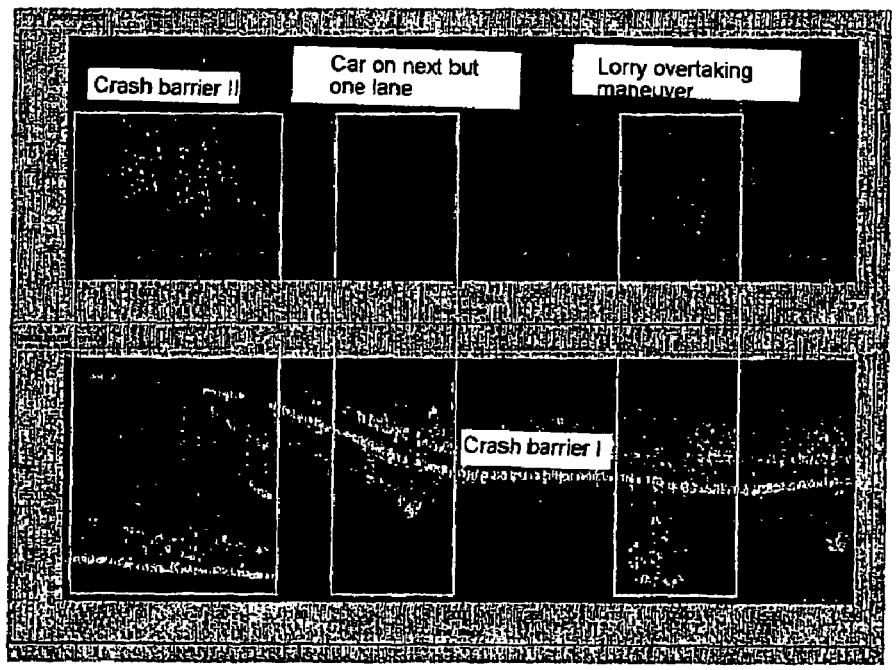
FIG. 28 shows a schematic representation of the radar signals corresponding to the complex scenario represented in FIG. 27 with lorry, car and crash barrier.

In FIG. 28 the recorded FMCW spectra are represented as a function of time for the scenario described in FIG. 27.

Figure 29:
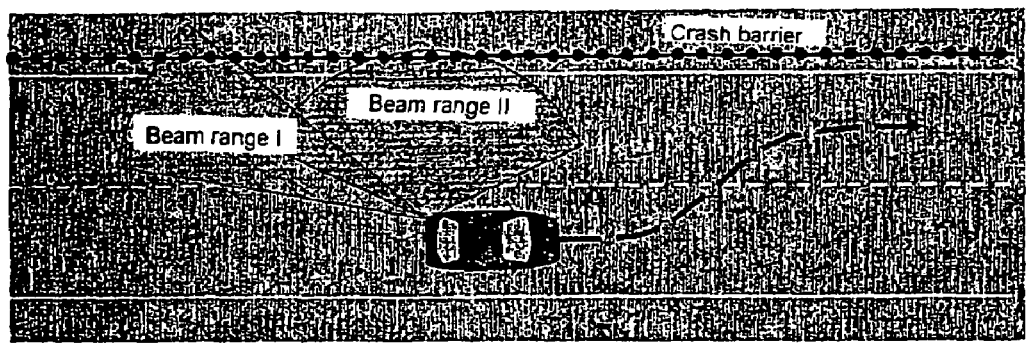
FIG. 29 the schematic representation of a fifth motorway scenario.
Figure 30:
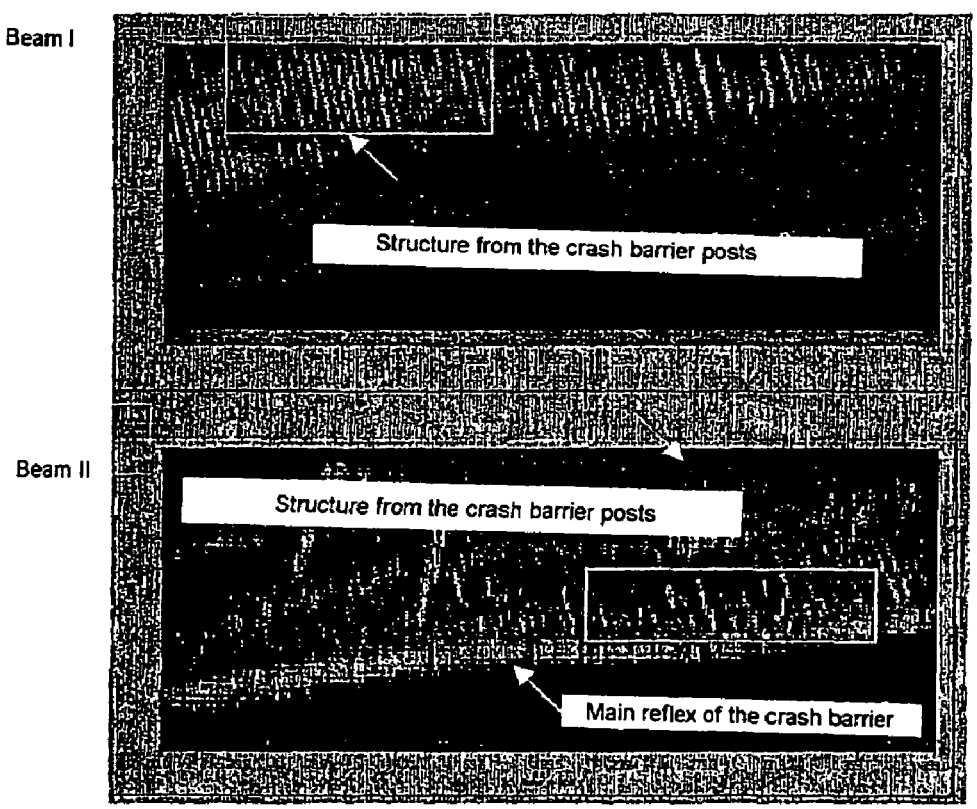
FIG. 30 shows a schematic representation of the radar signals corresponding to the scenario represented in FIG. 29 when approaching a crash barrier.
Figure 31:
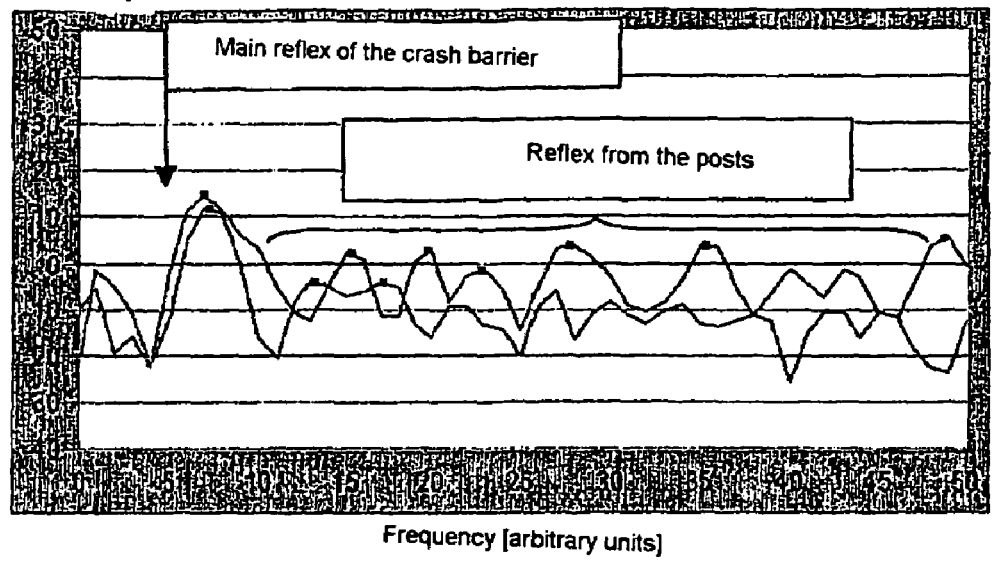
FIG. 31 shows a schematic representation of the separate FMCW spectra of the field of vision in beam II in the crash barrier scenario according to FIG. 29.
Figure 32:
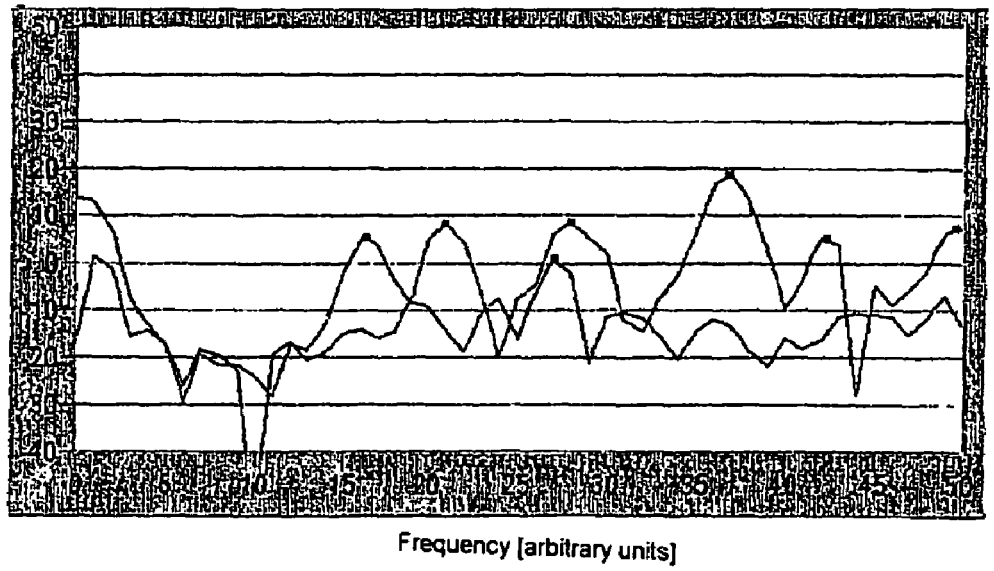
FIG. 32 shows a schematic representation of the separate FMCW spectra of the field of vision in beam I in the crash barrier scenario according to FIG. 29.

In the classification a search is made in the FMCW spectra for the typical features of the object that is to be classified. The following features are taken into consideration during the evaluation of the FMCW spectra and illustrated using the example of a crash barrier recognition (cf. FIG. 29 to 32):

Intensity distribution of the FMCW signal—in the scenario represented in FIG. 29 the motor vehicle ("host car") is moving essentially parallel to the crash barrier and approaches said crash barrier as a function of time. A crash barrier consists mainly of a horizontal metal structure that is supported by means of regularly arranged metal posts. In the FMCW spectrum in beam II this is distinguished by a main reflex (greatest intensity in the spectrum) (cf. FIG. 31), which represents the minimum distance to the crash barrier and to a large number of regularly arranged (constant spacing of the posts) reflexes from the crash barrier posts. In beam I, in contrast, on account of the geometric relationships, only a series of regularly arranged reflexes from the crash barrier posts can be recognized (see FIG. 32—wherein amplitude and frequency respectively are applied in "arbitrary units" [w.E.]). Using the minimum distance to the crash barrier, which distance can be determined using the information in beam II and the own speed, the position of the reflex points in beam I can be predetermined. If one combines the information from beam I and II, then advantageously one can obtain reliable statement about the presence and the position of a crash barrier in the monitoring region.

Temporal variation of the signal—because of its physical characteristics (regular arrangement of the metal parts, high degree of symmetry) the crash barrier is a very "stable" target for the radar, and correspondingly the temporal variation of the signals is minimal compared to other objects (such as pedestrians).

Temporal variation of the structure—because of the own speed and the geometric relationships, the temporal development of the reflex points of the crash barrier posts is predetermined. The main reflex point of the crash barrier remains, in parallel travel corresponding to the distance to the crash barrier, stationary at a relative speed of 0 m/s. The structure is visible for a correspondingly long time because of the spatial extent of the crash barrier.

Spatial variation of the structure—is determined by the geometric relationships and in the case of the crash barrier more likely minimal.

Structural difference within the two different FMCW measurements [(frequency ramp with a positive gradient (lower curve in FIG. 31) frequency ramp with a negative gradient (upper curve in FIG. 31)] taking into consideration own speed and direction of movement—characteristic for a crash barrier is, for example, the agreement of the two FMCW measurements for the main reflex and also of the speed-dependent shift of the reflex points that can be assigned to the crash barrier posts.

Structure width (putting together several intensity maxima to form a structure that can be assigned to an object)—as already described, the crash barrier is characterized by a large number of characteristic reflex points in the spectrum. These reflex points can all be assigned to the target crash barrier.

Intensity distribution within a structure as a function of frequency—characteristic for the crash barrier is the intensity maxima in the main reflex and also reflexes of lower intensity in connection with the main reflex.

Comparison of the structures in the two beam regions—direct connection between the position of the crash barrier reflex points in beam range I and II because of geometric considerations.

In summary, it should be noted that the features of the object classification are either derived here from the transfer of the physical/geometric object characteristics to its FMCW radar specific effect, or are generated using reference data based on typical measurements of the respective object classes.

Figure 33:
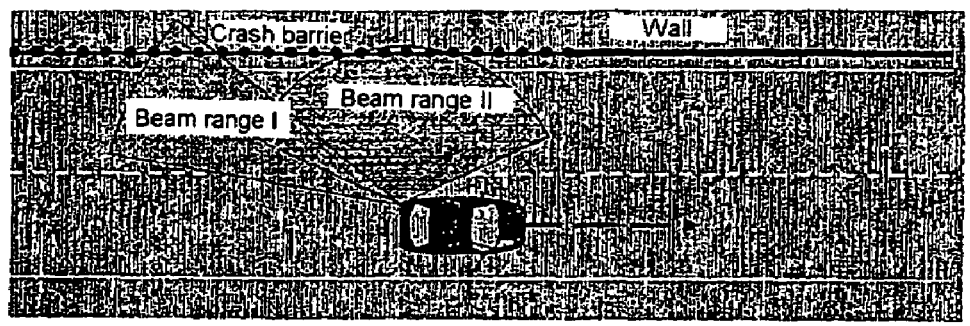
FIG. 33 shows a schematic representation of the schematic representation of a sixth motorway scenario.
Figure 34:
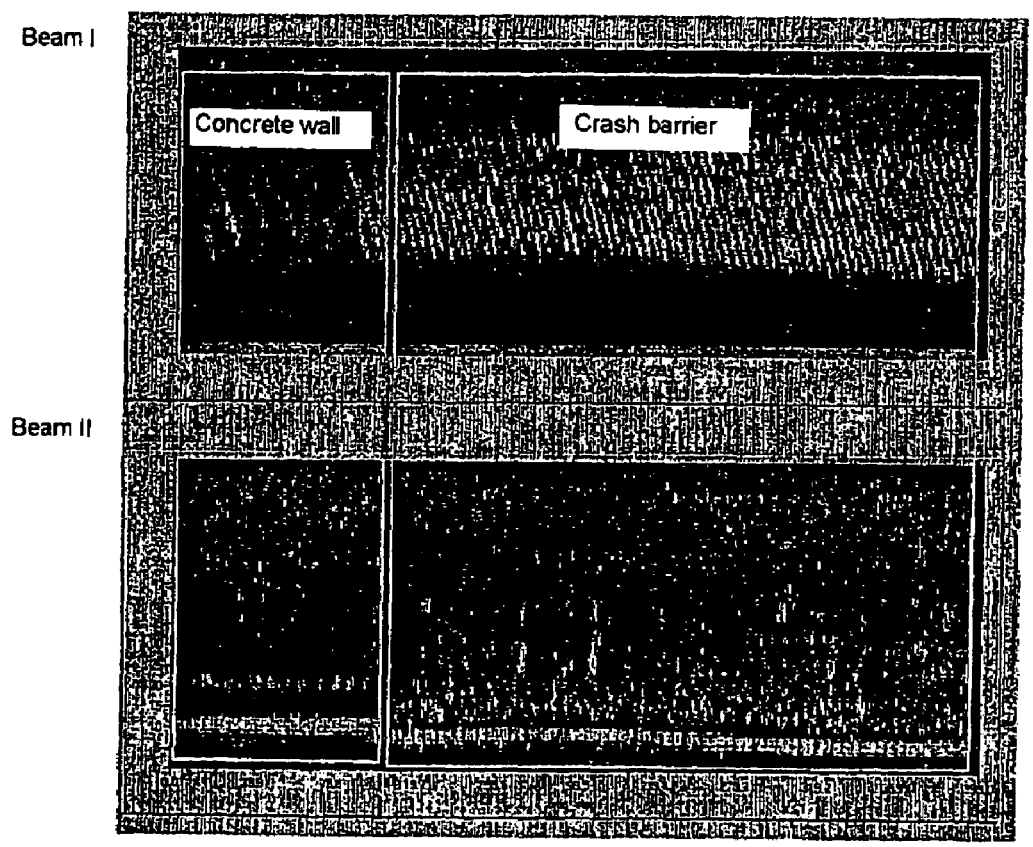
FIG. 34 shows a schematic representation of the radar signals corresponding to the scenario represented in FIG. 33 when the crash barrier becomes a concrete wall.

FIG. 33 shows a sixth typical motorway scenario, in which the motor vehicle ("host car") moves first parallel to a crash barrier and subsequently parallel to a concrete wall. The difference can be clearly recognized in the FMCW spectra of the two beam ranges (cf. FIG. 34). If the motor vehicle is moving along a concrete wall then there are no reflexes from the crash barrier posts. In contrast, the main reflex is present in both cases.

Figure 35:
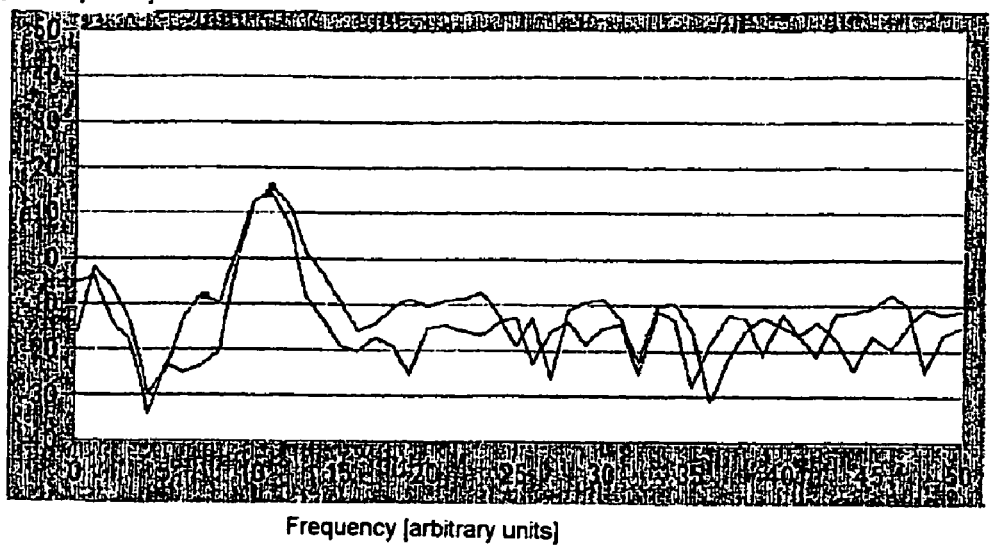
FIG. 35 shows a schematic representation of the separate FMCW spectra of the field of vision in beam II in the crash barrier—concrete wall scenario according to FIG. 33.
Figure 36:
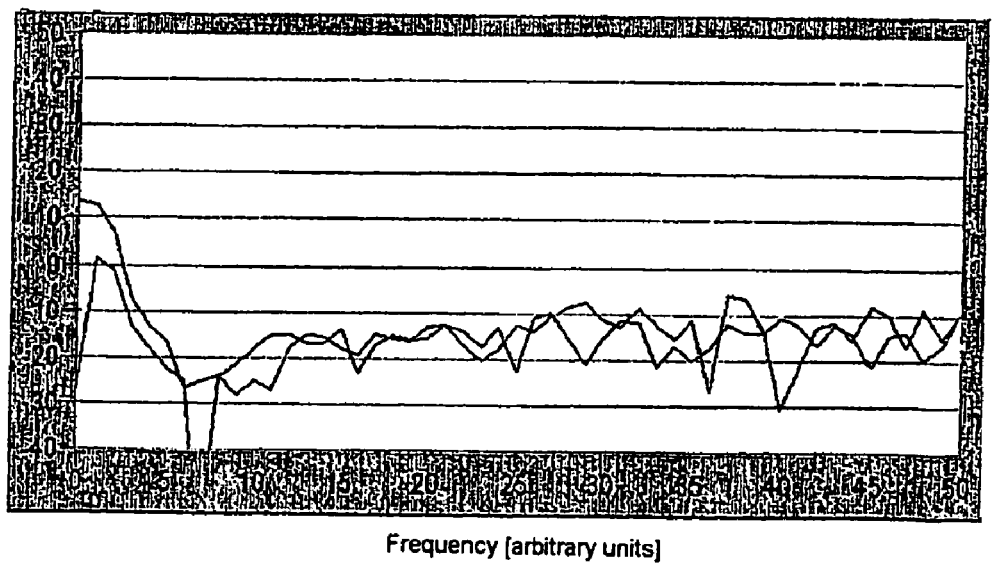
FIG. 36 shows a schematic representation of the separate FMCW spectra of the field of vision in beam I in the crash barrier—concrete wall scenario according to FIG. 33.

This difference becomes especially clear when the FMCW spectra of a single measuring cycle of both fields of vision are considered and these are compared with the crash barrier scenario (see FIGS. 35 und 36).

Figure 37:
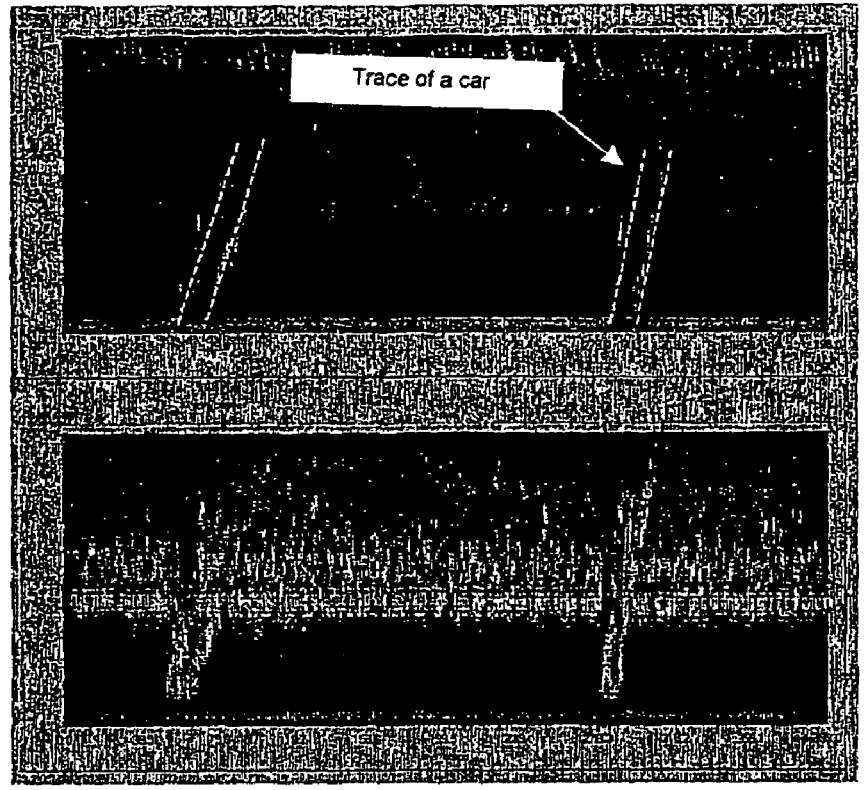
FIG. 37 shows a schematic representation of the radar signals based on and corresponding to the scenario represented in FIG. 14, where the motor vehicle is overtaken by two cars on the adjacent lane.
Figure 38:
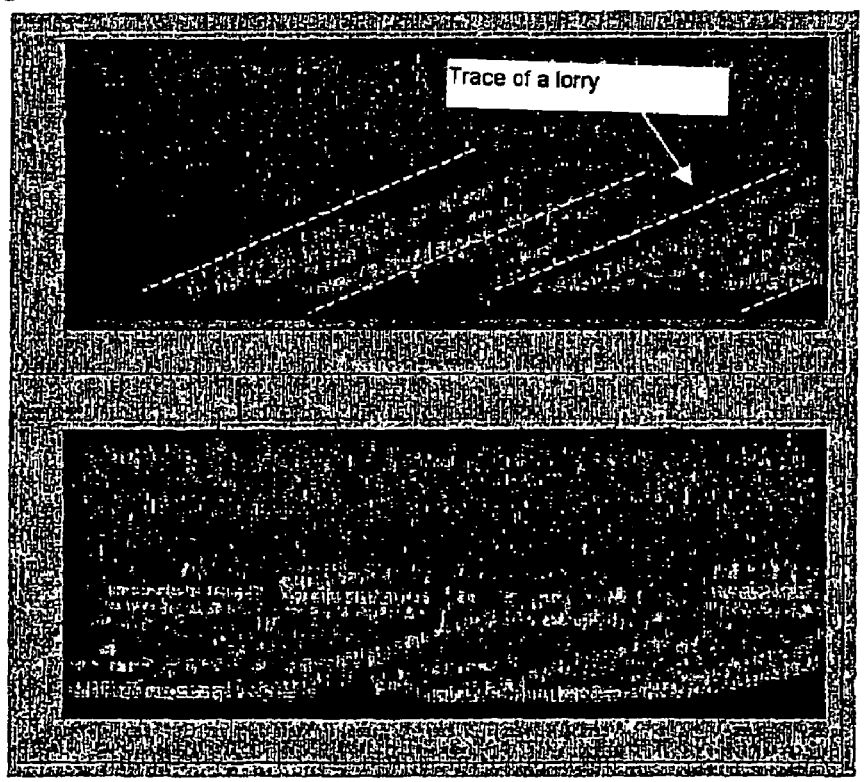
FIG. 38 shows a schematic representation of the radar signals based on and corresponding to the scenario represented in FIG. 14, where the motor vehicle is overtaken by a lorry with a trailer on the adjacent lane.

Finally, following the scenario represented in FIG. 14, two overtaking scenarios are shown in each of the FIGS. 37 and 38, in which scenarios the motor vehicle ("host car") equipped with the blind spot sensor system is overtaken by two cars (FIG. 37) or a lorry with a trailer (FIG. 38).

It can be clearly seen how a car and a lorry differ sufficiently in their respective dimensions. This also becomes clear in the recorded FMCW signals. The FKCW structure of a lorry is clearly larger and more structured compared to the car.

The structure width and its intensity distribution are characteristic for the respective object class lorry or car and are used in the classification process.

The present invention has proven itself, in particular as an application of a blind spot sensor system based on radar sensors (approx. 24 GHz or 77 GHz) suitable for emitting at least one first and one second radar beam with the following characteristics:

- two radar beams with two partially overlapping fields of vision (beam I/beam II);
- field of vision I leans towards the direction of travel and monitors the adjoining lane;
- field of vision II is oriented essentially vertically to the direction of travel and covers the monitoring region of the system with a wide sector area;
- the fields of vision have an overlap area and are tilted towards each other;
- switchable radar modulation principle of the sensor(s) mainly in beam range I (FMCW and CW) (but at least FMCW so as to be able to determine radial distance and speed);
- bi-static design of the radar sensor(s);
- radial fields of vision of the sensor(s) together cover at least the extent of the monitoring region. It is useful to have a greater field of vision of the sensor(s), in particular in beam range I, so as to be able to recognize objects early and track them;
- radial resolution typically $d_r<0.5$ m;
- radial speed resolution typically $d_v<2$ m/s; and
- measuring cycle time for (FMCW and CW) typically $d_t<30$ ms.

The present invention is thus particularly suitable for use in an assistance system, for example, for lane changing in modern motor vehicles of all types.

We claim:

1. A blind spot sensor system for detecting and/or classifying objects in a defined monitoring region of a motor vehicle, the blind spot sensor system comprising:
   at least one first device for emitting a first radar beam in a CW modulation mode and in a FMCW modulation mode, a radial field of vision of the first radar beam leaning towards a direction of travel of the motor vehicle; and
   a second device for emitting a second radar beam, a radial field of vision of the second radar beam being oriented substantially vertically to the direction of travel of the motor vehicle, the field of vision of the first and second radar beams at least partially overlap and together substantially cover measurements of the defined monitoring region.

2. The blind spot sensor system according to claim 1, wherein said first device is actuated to emit the first radar beam alternately and sequentially in the CW and FMCW modulation modes.

3. The blind spot sensor system according to claim 1, wherein said first device is actuated to emit the first radar beam in several FMCW modulation modes alternate with at least one CW modulation mode.

4. The blind spot sensor system according to claim 3, wherein said first device is actuated to emit the first radar beam such that the several FMCW modulation modes follow at least two CW modulation modes.

5. The blind spot sensor system according to claim 1, further comprising: a 2-beam sensor; said 2-beam sensor forming said first device and said second device.

6. The blind spot sensor system according to claim 1, wherein said first device includes a 1-beam sensor and said second device includes a 1-beam sensor.

7. The blind spot sensor system according to claim 5, in combination with a motor vehicle component, wherein said 2-beam sensor is mounted in the motor vehicle component, and the motor vehicle component is selected from the group consisting of a wing mirror, a fender, and a rear bumper of the motor vehicle.

8. The blind spot sensor system according to claim 6, in combination with a motor vehicle component and a rear bumper of the motor vehicle, wherein said 1-beam sensor outputting the first radar beam is mounted in the motor vehicle component; the motor vehicle component is selected from the group consisting of a wing mirror, a fender, a front wheel house, a B-pillar, and a side sill of the motor vehicle and; said 1-beam sensor outputting the second radar beam is mounted in the rear bumper of the motor vehicle.

9. The blind spot sensor system according to claim 1, wherein said first device emits the first radar beam with a width of 30° to 50°, and a tilt with respect to a longitudinal axis of the motor vehicle of 2° to 13°.

10. The blind spot sensor system according to claim 1, wherein said second device emits the second radar beam with a width of 70° to 140°, and a tilt with respect to a longitudinal axis of the motor vehicle of 2° to 53°.

11. The blind spot sensor system according to claim 1, further comprising object recognition and classification means configured to perform early recognition of an object by analyzing the first radar beam.

12. The blind spot sensor system according to claim 11, wherein said first device emits the first radar beam with a defined variable maximum radius and a defined variable minimum radius, which represent a detection range.

13. The blind spot sensor system according to claim 12, wherein the detection range of the first radar beam is configured such that the first radar beam monitors an adjoining lane.

14. The blind spot sensor system according to claim 13, wherein said object recognition and classification means is configured to decide whether an object is in the adjoining lane or two lanes over when a trace of the object falls below a radial distance.

15. The blind spot sensor system according to claim 11, wherein said object recognition and classification means is configured to classify an object that is detected at a defined radial distance in the first radar beam, as being in an adjoining lane.

16. The blind spot sensor system according to claim 15, wherein said object recognition and classification means is configured to track an object in an adjoining lane with the second radar beam until the object leaves the defined monitoring region.

17. The blind spot sensor system according to claim 1, further comprising object recognition and classification means configured to analyze the second radar beam to position an object in relation to the defined monitoring region.

18. The blind spot sensor system according to claim 1, further comprising object recognition and classification means configured to classify an object as relevant or non relevant by determining a relative speed of the object, wherein the following applies $$t_{min} = \frac{dx_{beam\_I\_beam\_II}}{V_{own}}$$

where:

$dx_{beam\_I\_beam\_II}$=lateral distance of two beam lobes; and
$V_{own}$=own speed of the motor vehicle or object.

19. The blind spot sensor system according to 1, further comprising object recognition and classification means configured to perform a pattern recognition.

20. The blind spot sensor system according to claim 19, wherein said object recognition and classification means derives features of an object classification from a transfer of physical/geometric object characteristics to its FMCW radar specific effect, or said object recognition and classification means generates the features of the object classification using reference data based on typical measurements of respective object classes.

21. The blind spot sensor system according to claim 20, wherein said object recognition and classification means takes the following features into consideration in an evaluation of a FMCW spectra:

an intensity distribution of a FMCW signal;

a temporal variation of the FMCW signal;

a temporal variation of structure;

a spatial variation of the structure;

a structural difference within the two different FMCW measurements taking into consideration their own speed and direction of movement;

a structure width;

an intensity distribution within a structure as a function of frequency; and/or a comparison of the structures in two beam regions.

22. The blind spot sensor system according to claim 20, whereon said object recognition and classification means compares the features of the objects found in a FMCW spectrum with reference patterns stored in a memory.

23. The blind spot sensor system according to claim 1, wherein said first device is actuated to emit the first radar beam such that five FMCW modulation modes alternate with one CW modulation mode.

24. The blind spot sensor system according to claim 3, wherein said first device is actuated to emit the first radar beam such that five FMCW modulation modes follow two CW modulation modes.

25. The blind spot sensor system according to claim 6, in combination with at least one motor vehicle component, wherein said 1-beam sensor of said first device is mounted in a motor vehicle component selected from the group consisting of a wing mirror, a fender, and a rear bumper, and said 1-beam sensor of said second device is mounted in a motor vehicle component selected from the group consisting of a wing mirror, a fender, and a rear bumper.

26. The blind spot sensor system according to claim 1, wherein said first device emits the first radar beam with a width of 40° and a tilt with respect to a longitudinal axis of the motor vehicle of 5° or 10°.

27. The blind spot sensor system according to claim 1, wherein said second device emits the second radar beam with a width of 80° or 130° and a tilt with respect to a longitudinal axis of the motor vehicle of 5°, 20° or 50°.

28. The blind spot sensor system according to claim 1, further comprising object recognition and classification means configured to position an object in relation to the monitoring region based on a radial position determination in the second radar beam.

* * * * *